United States Patent
Nagasaka et al.

(10) Patent No.: US 6,639,880 B2
(45) Date of Patent: Oct. 28, 2003

(54) APPARATUS FOR RECORDING AND/OR REPRODUCING DISC-SHAPED RECORDING MEDIUM INCLUDING DRIVING SOURCE FOR DRIVING CARRYING MECHANISM AND ELEVATING MECHANISM

(75) Inventors: Hideo Nagasaka, Tokyo (JP); Shinji Ito, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/245,319

(22) Filed: Sep. 18, 2002

(65) Prior Publication Data

US 2003/0016594 A1 Jan. 23, 2003

Related U.S. Application Data

(62) Division of application No. 09/544,802, filed as application No. PCT/JP99/04981 on Sep. 13, 1999.

(30) Foreign Application Priority Data

Sep. 19, 1998 (JP) ............................................. 10/283294
Oct. 20, 1998 (JP) ............................................. 10/298632

(51) Int. Cl.[7] .................................................. G11B 17/22
(52) U.S. Cl. ................................. 369/30.85; 369/30.78; 369/192
(58) Field of Search ........................... 369/30.78, 30.85, 369/30.92, 30.98, 30.99, 192; 360/92, 98.04

(56) References Cited

U.S. PATENT DOCUMENTS

| | | | | |
|---|---|---|---|---|
| 5,245,602 A | * | 9/1993 | Ikedo et al. | 369/75.2 |
| 5,267,225 A | * | 11/1993 | Fukasawa et al. | 369/30.85 |
| 5,528,442 A | * | 6/1996 | Hisatomi | 369/191 |
| 5,539,717 A | * | 7/1996 | Choi | 369/75.2 |
| 5,687,145 A | * | 11/1997 | Takashina et al. | 369/30.87 |
| 5,870,360 A | | 2/1999 | Ito et al. | 369/30.85 |
| 6,256,270 B1 | * | 7/2001 | Yoshimura | 369/30.78 |
| 6,262,952 B1 | * | 7/2001 | Takai | 369/30.77 |
| 6,310,853 B1 | | 10/2001 | Ito | 369/192 |

FOREIGN PATENT DOCUMENTS

| | | |
|---|---|---|
| CN | 1184310 A | 6/1998 |
| EP | 0 386708 A2 | 9/1990 |
| EP | 0845778 A2 | 6/1998 |
| JP | 64-15351 | 1/1989 |
| JP | 2-108273 | * 4/1990 |
| JP | 2-247863 | 10/1990 |
| JP | 5-041016 | * 2/1993 |
| JP | 6-309757 | 11/1994 |
| JP | 8/235745 | 9/1996 |
| JP | 10-162477 | 6/1998 |

* cited by examiner

*Primary Examiner*—Brian E. Miller
(74) *Attorney, Agent, or Firm*—Oblon, Spivak, McClelland, Maier & Neustadt, P.C.

(57) ABSTRACT

An apparatus for recording and/or reproducing a disc-shaped recording medium. A medium is placed on each of a plurality of placement members. The members are stacked and housed in a housing unit. An elevating mechanism elevates the housing unit in the direction almost parallel to the stack direction of the members. A carrying mechanism carries one of the members among a position where a medium can be placed or ejected to/from the member, a position where the member is housed in the housing unit and a position where the medium placed on the member is loaded to the recording and/or reproducing unit. A driving source drives both the carrying mechanism and the elevating mechanism. A switching mechanism selectively supplies a driving force from the driving source to the carrying mechanism and the elevating mechanism. A photodetector detects the presence/absence of the medium on the members in the housing unit.

3 Claims, 21 Drawing Sheets

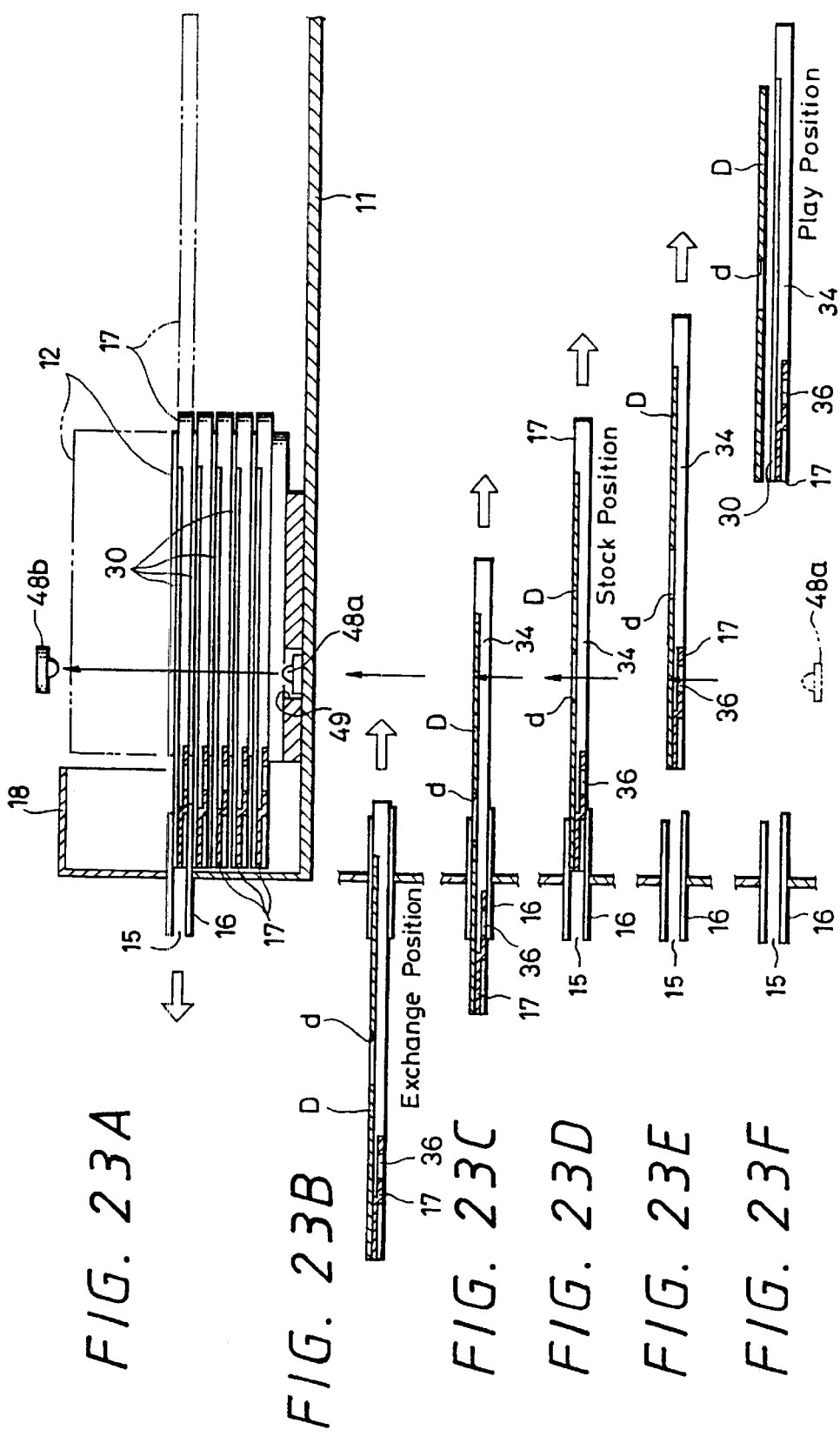

APPARATUS FOR RECORDING AND/OR REPRODUCING DISC-SHAPED RECORDING MEDIUM INCLUDING DRIVING SOURCE FOR DRIVING CARRYING MECHANISM AND ELEVATING MECHANISM

CROSS-REFERENCE TO RELATED APPLICATIONS

This application is a divisional application of, and claims priority to, Ser. No. 09/554,802 filed Jul. 20, 2000, and is a 371 of PCT Application No. PCT/JP99/04981 filed Sep. 13, 1999.

TECHNICAL FIELD

The present invention relates to an apparatus for recording and/or reproducing a disc-shaped recording medium, which records or reproduces an information signal by using an optical disc such as a CD (compact disc) or a CD-ROM (read-only memory), a disc-shaped recording medium such as a magneto optical disc, or the like. More particularly, the invention relates to an apparatus for recording and/or reproducing a disc-shaped recording medium, which can selectively switch an operation of elevating a housing member for housing a plurality of placement members each on which a disc-shaped recording medium is placed and an operation for carrying any one of a plurality of placement members at least between a position where the placement member is housed in the housing member and a position where a disc-shaped recording medium is loaded to a recording and/or reproducing unit.

BACKGROUND ART

Conventionally, generally, as an example of an apparatus for recording and/or reproducing a disc-shaped recording medium, there has been provided a disc recording and/or reproducing apparatus for reproducing music, movie, or the like by using a disc-shaped recording medium such as a CD or CD-ROM. As a disc recording and/or reproducing apparatus of this kind, for example, a disc player 1 as shown in FIG. 1 is known.

The disc player 1 has the function of, for example, housing three disc cartridges 2 at once, consecutively reproducing the three discs housed in the disc cartridges 2 and reproducing music pieces recorded on discs housed in the three disc cartridges 2 in accordance with an arbitrary order. The disc player 1 comprises a changer 3 capable of housing the three disc cartridges 2, a carrying mechanism for selecting and carrying an arbitrary disc cartridge 2 between the changer 3 and a disc driving device, and a recording/reproducing mechanism for chucking the disc cartridge 2 carried by the carrying mechanism and recording or reproducing music or the like.

The changer 3 is mounted in the central part of the front face of the device body 4 and has three cartridge insertion ports 5a, 5b, and 5c on its front face. The three cartridge insertion ports 5a to 5c are arranged at predetermined intervals in the vertical direction (three-layer structure). On one sides of the cartridge insertion ports 5a to 5c, ejection buttons 6a, 6b, and 6c for ejecting the disc cartridges 2 inserted in the corresponding cartridge insertion ports 5a to 5c are provided, respectively.

The front face of the changer 3 is covered with a door 7 attached to the front side of the device body 4. On both sides of the door 7, a number of operation buttons 8 such as a power button for turning on/off the power source, a feed button, and a stop button are arranged. When the door 7 is opened to expose the front face of the changer 3 and the disc cartridges 2 are inserted from the cartridge insertion ports 5a to 5c, the three disc cartridges 2 are housed and held in predetermined positions.

Behind the changer 3, a carrying mechanism for selectively taking and carrying arbitrary one of the three disc cartridges 2 housed in predetermined positions is provided. Near the carrying mechanism, a disc reproducing device for chucking the disc as a recording medium of the disc cartridge 2 supplied by the carrying mechanism and loaded in a predetermined position, reading a sound signal or the like, and reproducing music or the like is disposed.

In the conventional disc player 1 as described above, however, three motors are used as driving sources; a motor for vertically moving a holder for selectively taking out an arbitrary disc cartridge 2 from the three disc cartridges 2 housed in cartridge housing parts in three positions, a motor for carrying a cartridge holder for holding the taken disc cartridge 2 to the disc reproducing device, and a motor for chucking the disc cartridge 2 supplied to the disc reproducing device and rotating it at predetermined speed. Since an independent motor is used for each of the operations such as ejection of the disc cartridge, carriage of the disc cartridge, and the like, there are problems such that the number of motors used is large, the whole device is heavy, and it is uneconomical.

Ditto for a disc player using a disc-shaped recording medium such as a CD in place of the above-described disc cartridge 2. The disc player of this kind is provided with a plurality of disc trays on which a plurality of CDs are placed, respectively, and a tray stocker for holding the plurality of disc trays. As driving sources of those components, total three motors are used; a motor for vertically moving the tray stocker, a motor for ejecting the disc trays held by the tray stocker from the device body and carrying a CD placed on the disc tray to the disc reproducing unit, and a motor for moving a spindle motor in the disc reproducing unit and chucking the CD. The disc player also has the three motors and, likewise, the number of motors is large.

The inventor who applies for the present invention has completed a mechanism capable of performing the above-mentioned three kinds of operations by two motors. According to the mechanism, both the operation of vertically moving the tray stocker for holding the plurality of disc trays and the carrying operation of tacking and carrying one of the disc trays held in the tray stocker can be performed by a single motor. The inventor had made efforts to realize an operation of exchanging disc-shaped recording media during recording or reproducing of a disc-shaped recording medium by using a single motor as a driving source and could have invented an exchange mechanism having such a function.

In the exchange mechanism, however, whether the disc-shaped recording medium is placed on the disc placement part of the disc tray or not has to be sensed. An optical sensor is therefore disposed inside of the front face of the device body and the presence or absence of the disc-shaped recording medium is determined according to whether light emitted from the optical sensor is interrupted or not. Since the optical sensor is disposed near the recording medium insertion port, there is a case that external light enters the device body and it causes a problem such that the presence/absence of the disc-shaped recording medium is erroneous determined due to the influence of external light.

Further, since a wiring board, operation buttons an other electronic parts mounted on the wiring board, a display panel, and the like are disposed where the optical sensor is mounted, those components interfere with the optical sensor. It brings about a problem such that designing of the disc recording/reproducing apparatus is limited.

In the exchanging mechanism, a power transmission path connecting a feed gear to be engaged with a rack formed in the disc tray and the motor for driving the feed gear so as to transmit the power is directly connected. Since the driving force of the motor is directly transmitted from the feed gear to the rack, it causes the following problem. There is the possibility that the disc tray erroneously is moved due to the rotation of the motor during recording or reproduction of the disc-shape recording medium.

The invention has been achieved in consideration of the conventional problems and an object of the invention is to provide an apparatus for recording and/or reproducing a disc-shaped recording medium, whose weight and size are reduced by decreasing the number of motors as driving sources and also whose manufacturing cost is reduced, thereby solving the problems.

Further, an object of the invention is to provide an apparatus for recording and/or reproducing a disc-shaped recording medium, which comprises a photodetector almost in a center of a position where a disc tray housed in a housing part is housed and which can detect the presence or absence of a disc-shaped recording medium by turning on or off light from the photodetector by the disc-shaped recording medium being carried without causing an erroneous decision due to an influence of external light and increase the degree of freedom in designing by reducing limitation on designing, thereby solving the problems.

Further, an object of the invention is to provide an apparatus for recording and/or reproducing a disc-shaped recording medium, capable of realizing an exchanging function with a simple structure by disconnecting the power transmitting path during recording or reproduction of a disc-shaped recording medium so as not to transmit a driving force to a feed gear, thereby solving the problems.

DISCLOSURE OF THE INVENTION

An apparatus for recording and/or reproducing a disc-shaped recording medium according to the invention comprises: a plurality of placement members on each of which a disc-shaped recording medium is placed; a housing unit in which the placement members are stacked and housed; an elevating mechanism for elevating the housing unit in the direction almost parallel to the stack direction of the placement members; a recording and/or reproducing unit for recording or reproducing the disc-shaped recording medium; a carrying mechanism for carrying at least one of the plurality of placement members between a position where the placement member is housed in the housing unit and a position where the disc-shape recording medium placed on the placement member is loaded to the recording and/or reproducing unit; a driving source for driving both the carrying mechanism and the elevating mechanism; and a switching mechanism for selectively supplying a driving force from the driving source to the carrying mechanism and the elevating mechanism.

Further, an apparatus for recording and/or reproducing a disc-shaped recording medium according to the invention comprises: a plurality of placement members on each of which a disc-shaped recording medium is placed; a housing unit in which the placement members are stacked and housed; an elevating mechanism for elevating the housing unit in the direction almost parallel to the stack direction of the placement members; a recording and/or reproducing unit for recording or reproducing the disc-shaped recording medium; a carrying mechanism for carrying one of the plurality of placement members among a position where a disc-shaped recording medium can be placed or ejected to/from the placement member, a position where the placement member is housed in the housing unit and a position where the disc-shape recording medium placed on the placement member is loaded to the recording and/or reproducing unit; a driving source for driving both the carrying mechanism and the elevating mechanism; and a switching mechanism for selectively supplying a driving force from the driving source to the carrying mechanism and the elevating mechanism.

Further, an apparatus for recording and/or reproducing a disc-shaped recording medium according to the invention comprises: a plurality of placement members on each of which a disc-shaped recording medium is placed; a housing unit in which the placement members are stacked and housed; a recording and/or reproducing unit for recording or reproducing the disc-shaped recording medium; a moving mechanism for moving the recording and/or reproducing unit from a position where the disc-shaped recording medium on the placement member is lifted from the placement member and a position lower than the placement member; a carrying mechanism for carrying one of the plurality of placement members between a position where the placement member is housed in the housing unit and a position where the disc-shape recording medium placed on the placement member is loaded to the recording and/or reproducing unit; a driving source for driving the carrying mechanism; and a transmitting mechanism for interrupting transmission of a driving force from the driving source when the recording and/or reproducing unit is moved to the lifting position.

BRIEF DESCRIPTION OF DRAWINGS

FIG. 23 is an explanatory diagram for explaining the positional relation between the disc tray and a photodetector of the apparatus of the invention for recording and/or reproducing a disc-shaped recording medium, in which FIG. 23A shows that the disc tray is in a position where the disc-shaped recording medium is housed in the housing part, FIG. 23B shows that the disc tray is in a position where the recording medium can be placed or taken out, FIG. 23C shows that the disc tray is in a position between FIGS. 23A and 23B, FIG. 23D shows that the recording unit is housed in the housing part, FIG. 23E illustrates that the disc tray is in a position between FIGS. 23D and 23F, and FIG. 23F illustrates that the disc tray is in the position where the recording medium is loaded into a recording and/or reproducing unit.

BEST MODE FOR CARRYING OUT THE INVENTION

An embodiment of the invention will be described hereinbelow with reference to the drawings. FIGS. 2 to 23 show the embodiment of the invention. The invention is applied to a disc recording/reproducing apparatus for performing both recording and reproducing as an embodiment of an apparatus for recording and/or reproducing a disc-shaped recording medium, which records (writes) and/or reproduces (reads) information by using, as a disc-shaped recording medium, an optical disc such as a CD or CD-R (rewritable) or an optical disc such as a magneto optic disc.

Figure 1:
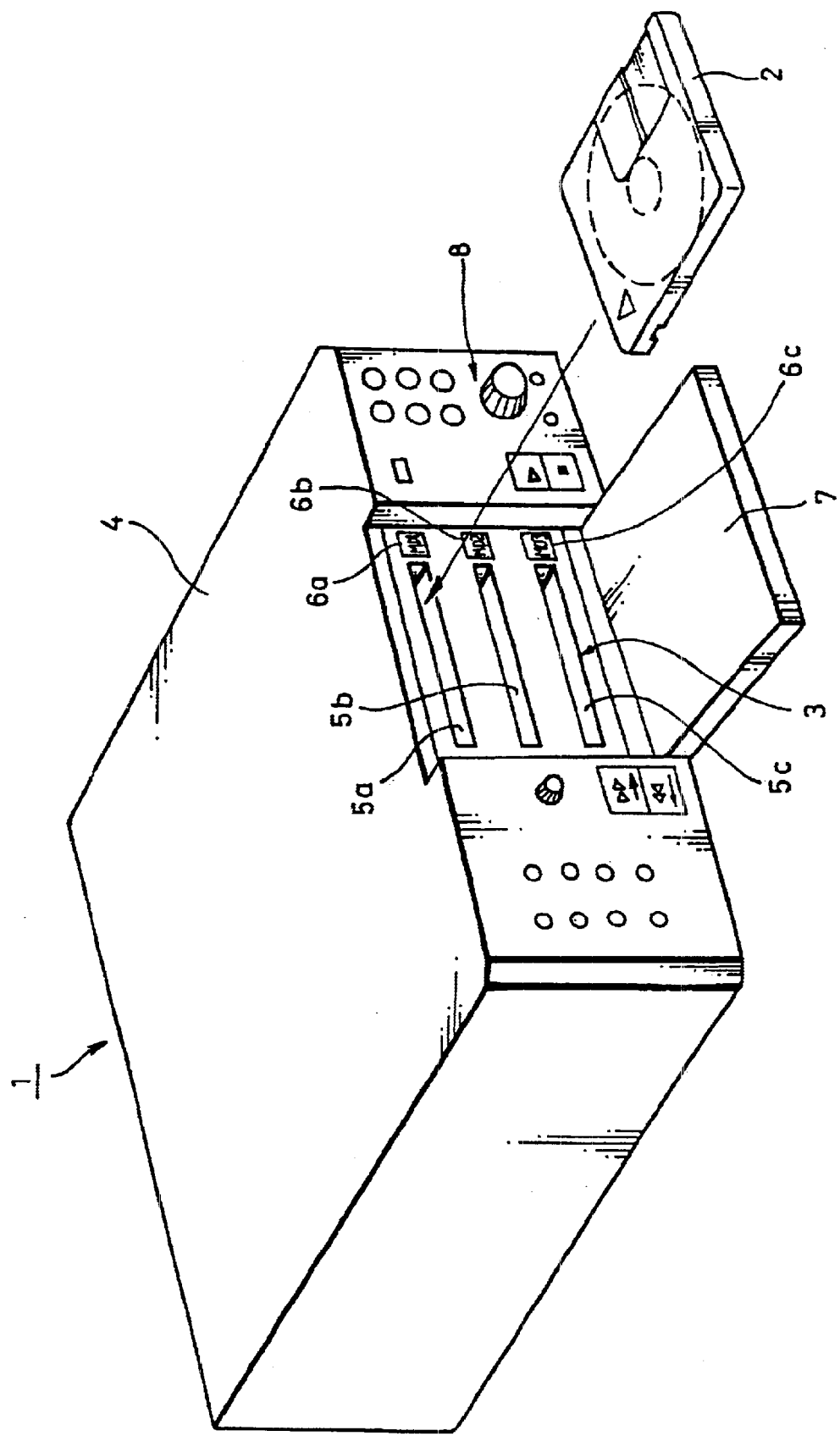
FIG. 1 is a perspective view showing an example of a conventional apparatus for recording and/or reproducing a disc-shaped recording medium.
Figure 2:
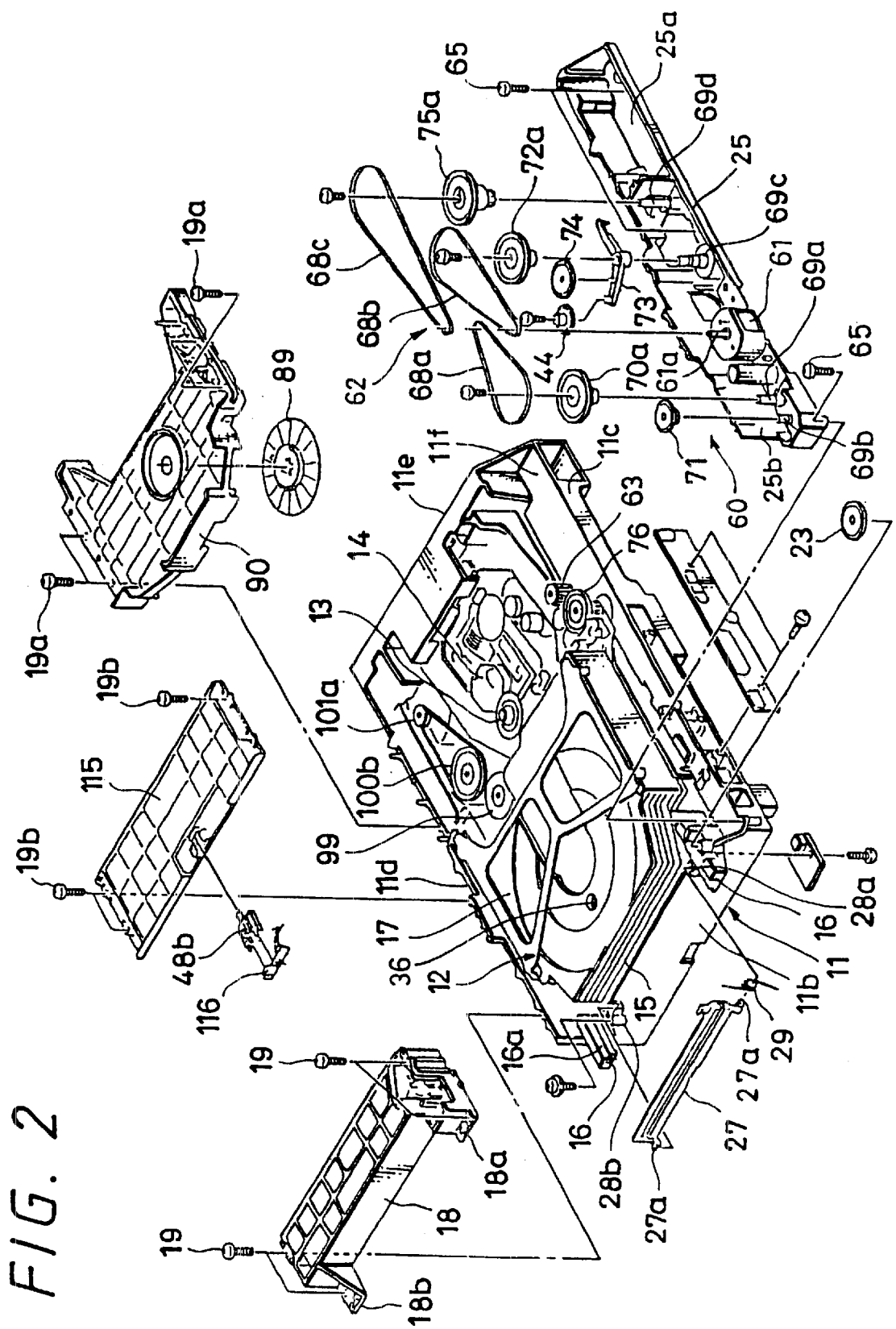
FIG. 2 is a perspective view showing an example of an apparatus of the invention for recording and/or reproducing a disc-shaped recording medium in a state where components are disassembled block by block.
Figure 3:
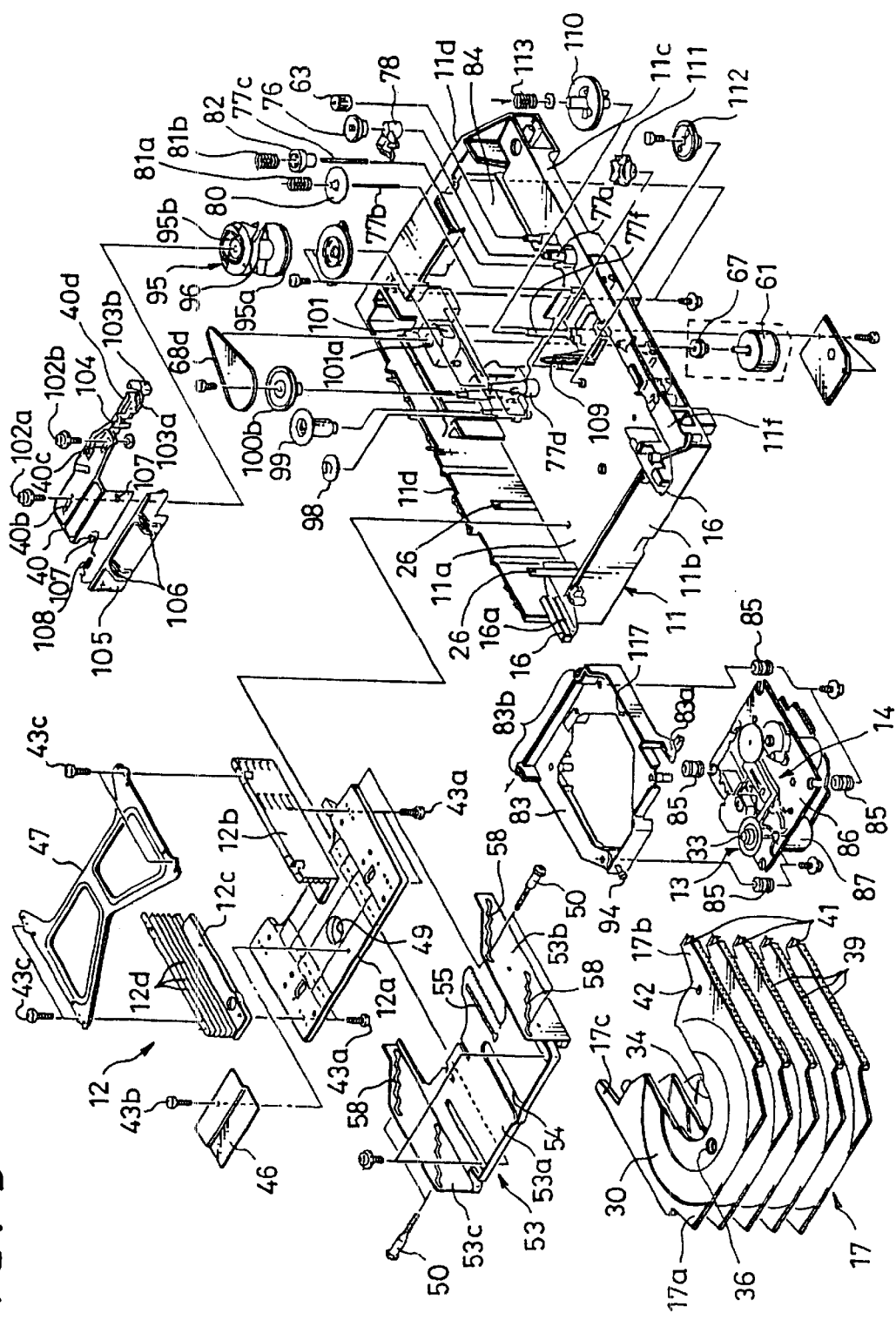
FIG. 3 is a perspective view showing an example of an apparatus of the invention for recording and/or reproducing a disc-shaped recording medium in a state where components are disassembled.
Figure 4:
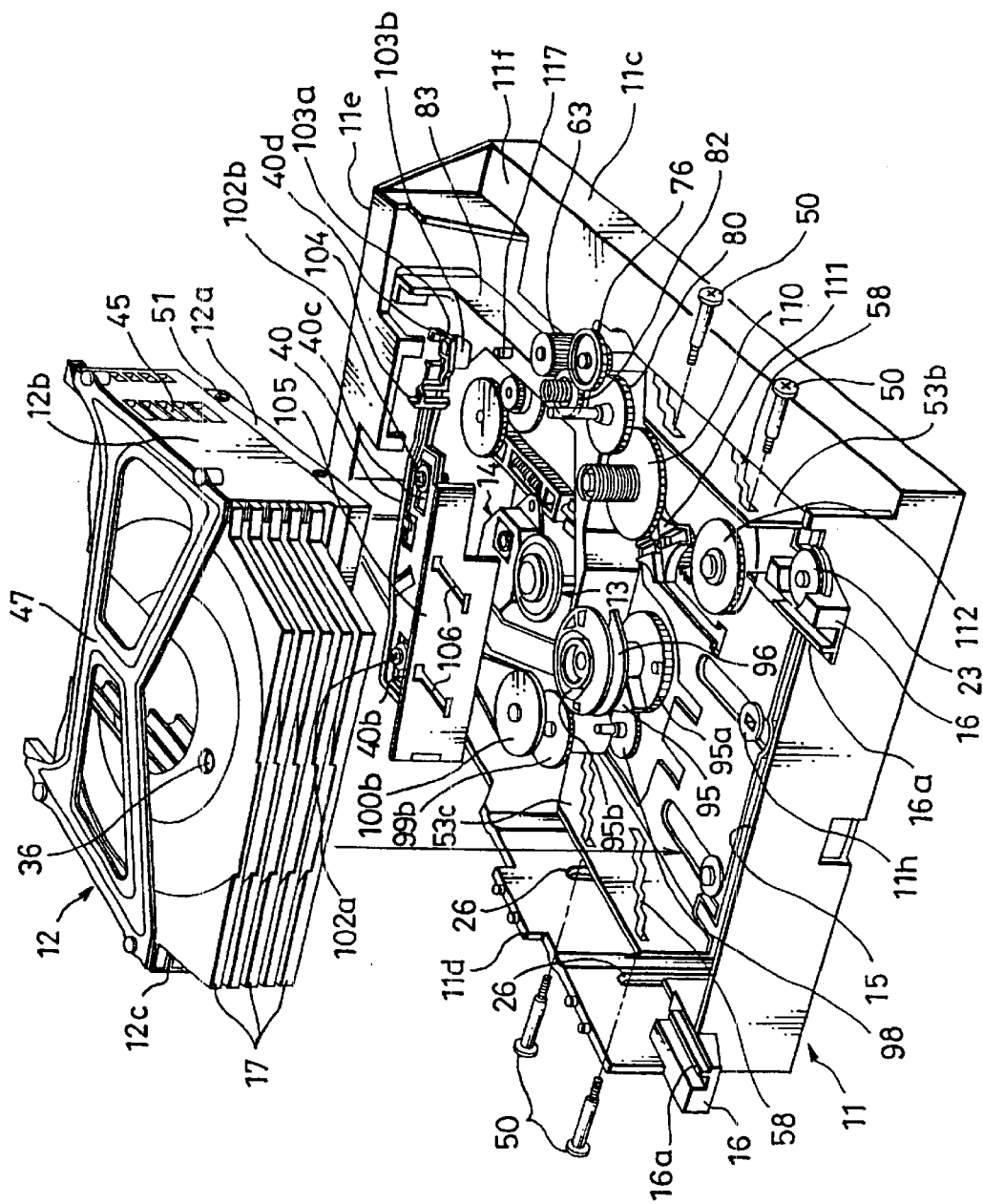
FIG. 4 is a perspective view showing a chassis assembly and a stocker assembly in an example of an apparatus of the invention for recording and/or reproducing a disc-shaped recording medium.

As shown in FIGS. 2 to 4, a disc recording/reproducing apparatus 10 according to the embodiment of the invention comprises a chassis 11 as a casing whose top face is open. In the chassis 11, there are provided a tray stocker 12 as a housing member capable of stocking five recordable/reproducible optical discs D as an example of disc-shape recording media at once; a disc rotating device 13 for chucking the optical disc D supplied from the tray stocker 12 and rotating the optical disc D at predetermined speed (for example, constant linear velocity); an optical pickup device 14 for writing (recording) and/or reading (reproducing) an information signal to/from the optical disc D rotated at predetermined speed; a controller for controlling the operations of the devices; and other devices.

As shown in FIG. 3, the chassis 11 is a rectangular casing with an open top face and comprises a bottom plate 11a having an almost rectangle, a front plate 11b extended from the front part of the bottom plate 11a, right and left side plates 11c and 11d continued from both sides of the bottom plate 11a, and a rear plate 11e continued from the rear part of the bottom plate 11a. As illustrated in FIG. 4, on the front plate 11b of the chassis 11, a tray insertion/ejection port 15 as an elongated opening which extends in the lateral direction is formed by setting the height of the front plate 11b so as to be lower than the side plates 11c and 11d and the like.

As shown in FIGS. 2 to 4, one of the side plates, 11c, of the chassis 11 is provided with a shelf 11f on which a side mount base 25 is attached. On the other side plate 11d of the chassis 11, as shown in FIGS. 3 and 4, two vertical grooves 26 and 26 extend vertically with a predetermined gap in the longitudinal direction.

The side mount base 25 has a fixed plate 25a extending in the longitudinal direction and a side wall 25b continued on one side in the width direction of the fixed plate 25a. The side wall 25b of the side mount base 25 is developed in the direction which perpendicularly crosses the plane direction of the fixed plate 25a. The side mount base 25 is detachably fixed to the chassis 11 by a plurality of fixing screws 65.

In the side wall 25b of the side mount base 25, two vertical grooves (not shown) are provided with a predetermined gap in the longitudinal direction. The two vertical grooves are formed in positions opposite to the two vertical grooves 26 and 26 formed in the other side plate 11*d* in a state where the side mount base 25 is fixed to the side plate 11*d*. The two vertical grooves have the size similar to that of the vertical grooves 26, 26. By being guided along the four vertical grooves, the tray stocker 12 is moved up and down as will be described hereinlater. The side mount base 25 is provided with four supporting shafts 69*a* to 69*d* and a driving motor 61 which will be described hereinlater.

On both sides of the tray insertion/ejection port 15, a pair of tray guides 16, 16 protruding from the front plate 11*b* and extending rearward, that is, to the inside are provided. The pair of tray guides 16, 16 support both sides in the direction crossing the carrying direction of the disc tray 17 as a placement member from below. The pair of tray guides 16, 16 are provided with guide rails 16*a*, 16*a* extending in the tray carrying direction as the longitudinal direction of the chassis 11 so as to protrude upward.

Figure 6:
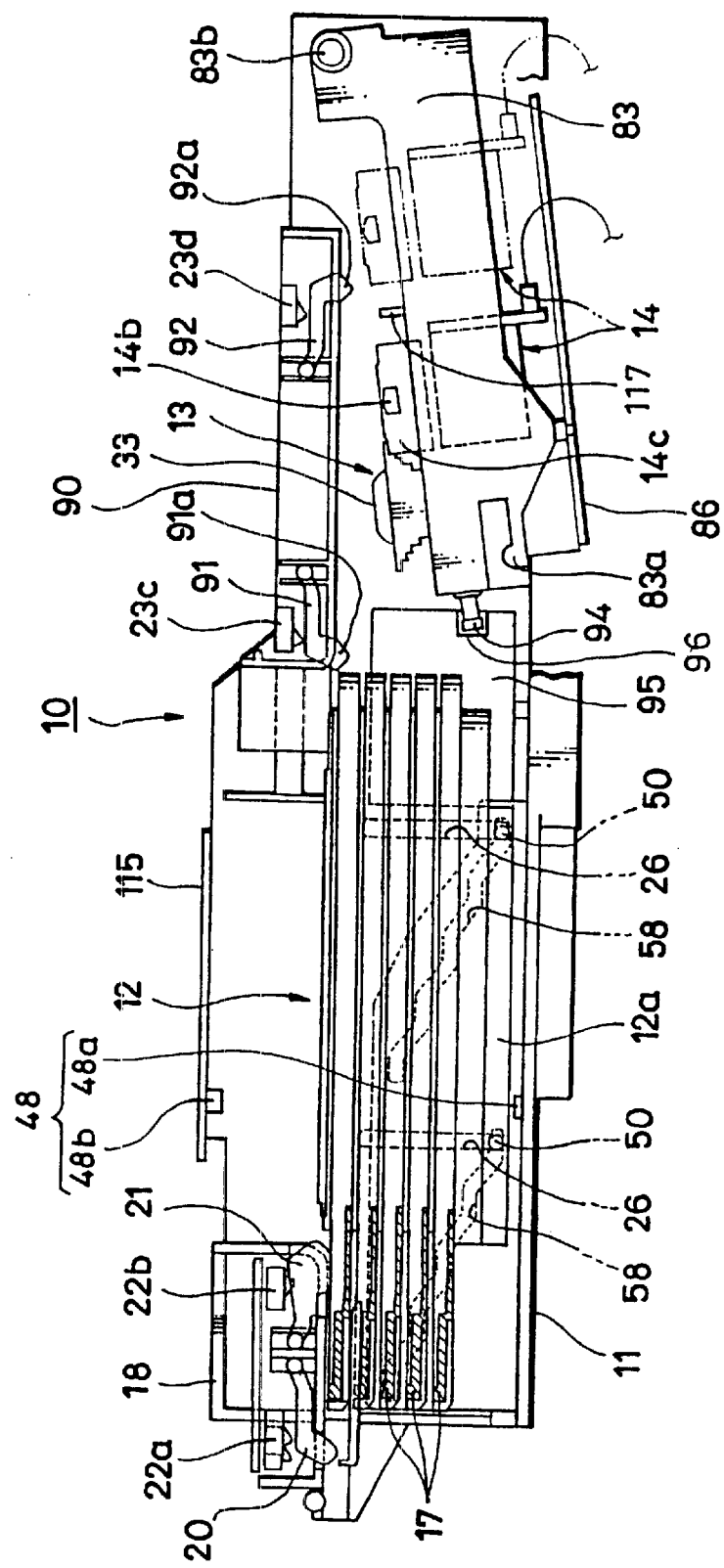
FIG. 6 is a cross section taken along X—X line of the apparatus for recording and/or reproducing a disc-shaped recording medium according to the invention shown in FIG. 4.

As shown in FIGS. 2, 6, and so on, on the front side of the chassis 11, a front mount base 18 is fixedly mounted by fixing screws 19 as fixing means. The front mount base 18 is a block member attached across the chassis 11. Under both ends in the longitudinal direction of the front mount base 18, a pair of tray pressers 18*a* and 18*b* disposed so as to face the pair of tray guides 16, 16 in the vertical direction are provided.

Figure 9:
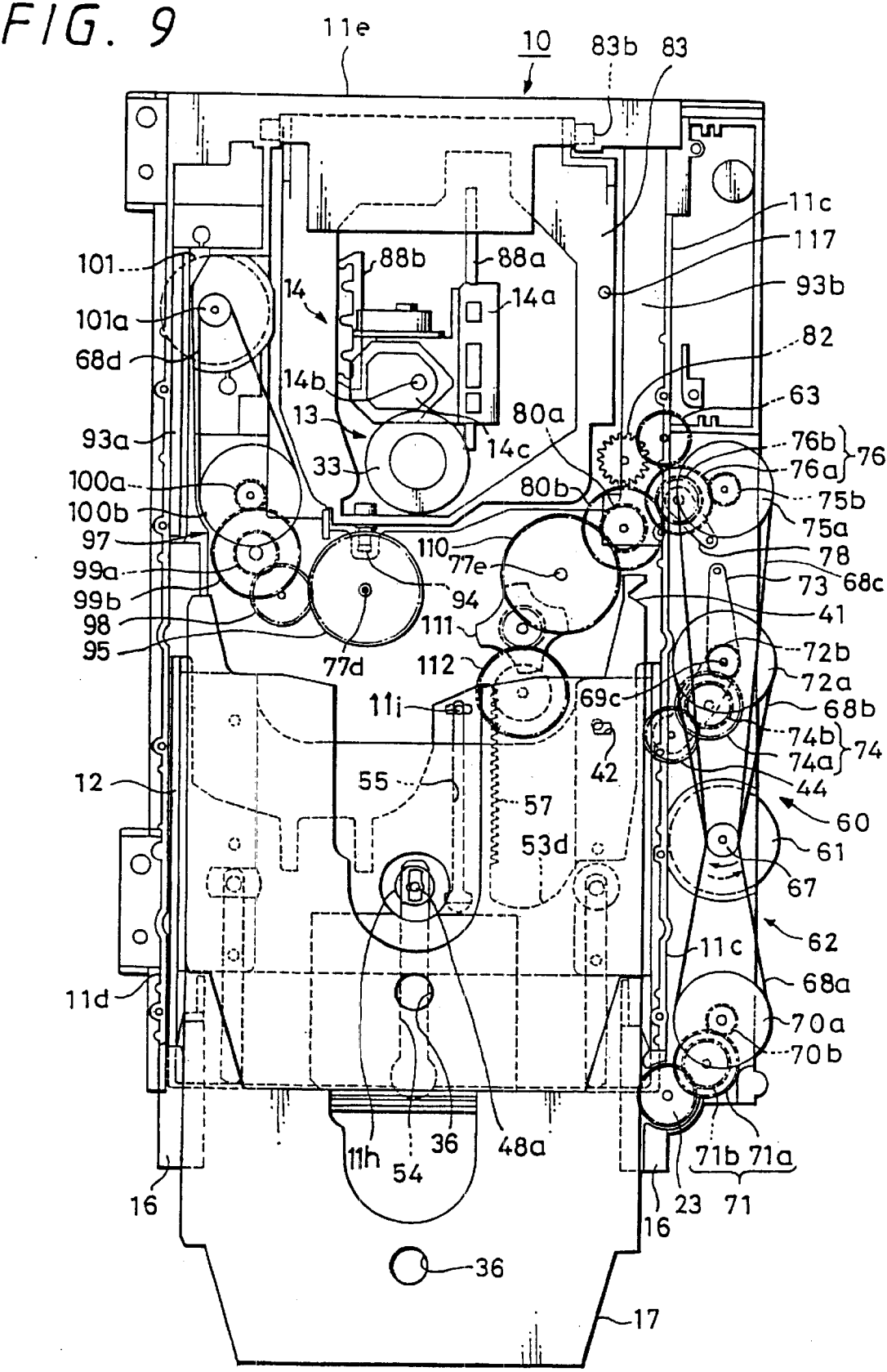
FIG. 9 is a plan view showing a state where the disc tray of the apparatus of the invention for recording and/or reproducing a disc-shaped recording medium is moved to a position where the disc-shaped recording medium can be placed or ejected.
Figure 12:
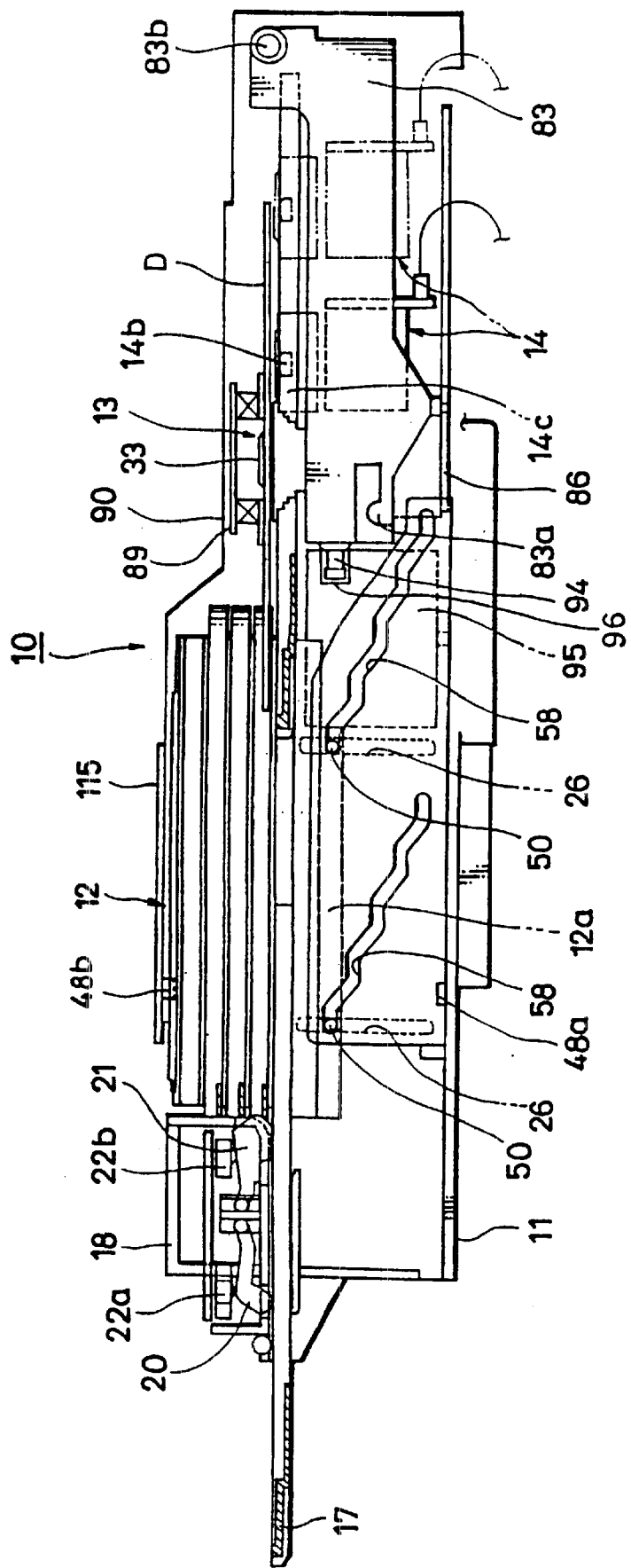
FIG. 12 is a plan view showing a state where the disc tray of the apparatus of the invention for recording and/or reproducing a disc-shaped recording medium has been moved in a position where the disc-shaped recording medium can be placed or ejected during recording or reproduction.

When the disc tray 17 is ejected, both sides of the disc tray 17 are supported so as to be sandwiched by the tray guides 16, 16 and the tray pressers 18*a*, 18*b* which are paired with each other in the vertical direction. Consequently, as shown in FIGS. 9 and 12, the front part of the disc tray 17 is projected from the front plate 11*b* and the disc tray 17 is held in an overhung state in the ejected position in which the optical disc D can be placed or taken out.

Figure 11:
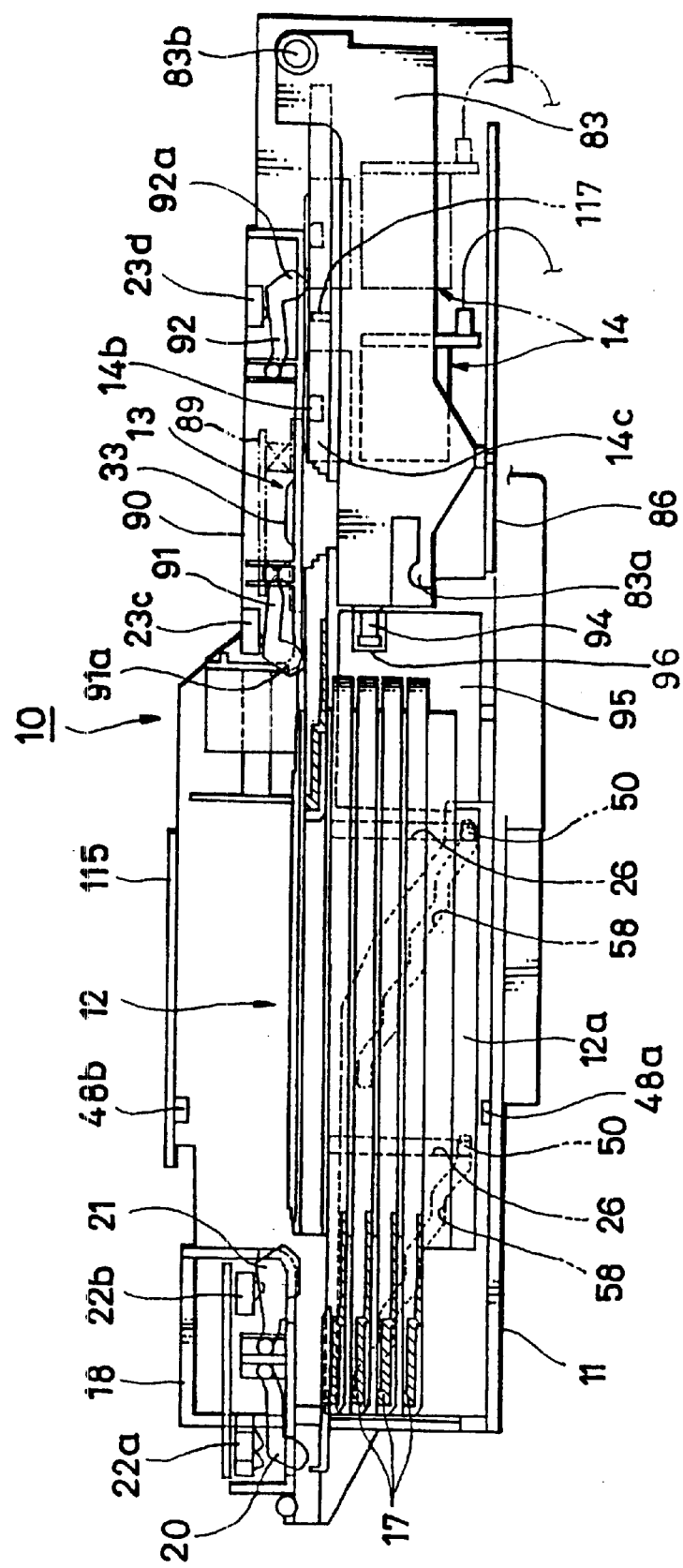
FIG. 11 is a plan view showing a state where a disc tray of an apparatus of the invention for recording and/or reproducing a disc-shaped recording medium is moved to a position where a disc-shaped recording medium placed on the disc tray is loaded into a recording and/or reproducing unit, and the recording and/or reproducing unit is moved to a position where the disc-shaped recording medium is lifted from a placement member.

To the tray presser 18*a* of the front mount base 18, as shown in FIGS. 6, 11, and so on, a front detection arm 20 and a rear detection arm 21 for detecting the disc tray 17 are attached so as to be swingable in the vertical direction. Each of the detection arms 20 and 21 has an input part projecting on the path of the disc tray 17. Detection switches 22*a* and 22*b* are disposed above, that is on the side opposite to the detection arms 20 and 21, respectively. The detection arm 20 or 21 is pushed up by the disc tray 17 to turn on (or off) the corresponding detection switch 22*a* or 22*b*, thereby enabling the passage of the disc tray 17 in the position where the switch is attached to be detected.

Further, as shown in FIG. 4, a front feed gear 23 is rotatably attached to one of the tray guides 16. A rack which will be described hereinlater formed in the disc tray 17 comes into engagement with the front feed gear 23 at the time of ejection. By the rotational force of the front feed gear 23, the disc tray 17 is moved forward or rearward according to the rotation direction.

Figure 5:
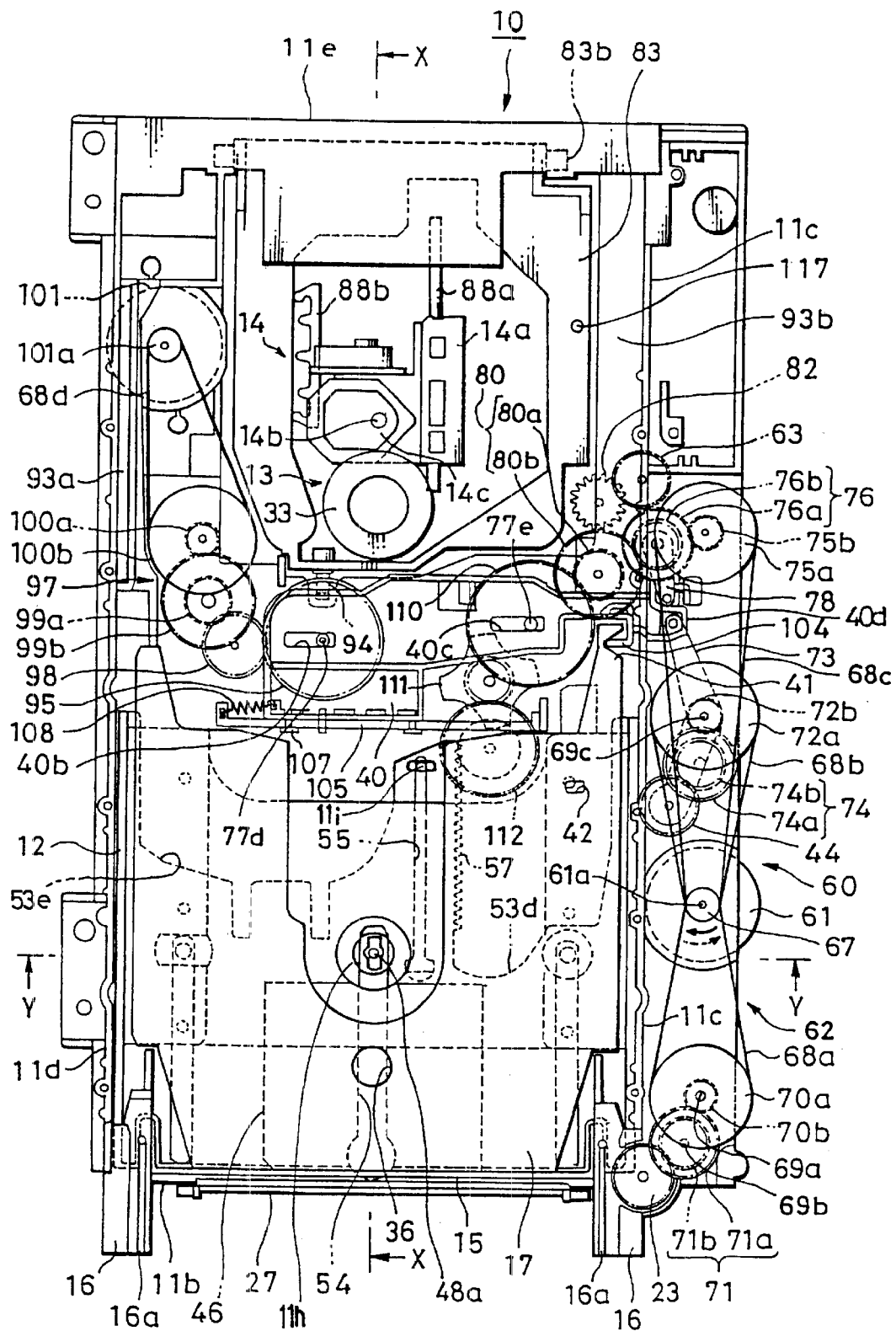
FIG. 5 is a plan view showing a state where a plurality of disc trays are stocked in a tray stocker in positions where disc trays are housed in an example of an apparatus of the invention for recording and/or reproducing a disc-shaped recording medium.

As shown in FIGS. 2, 5, and so on, on the front face of the front plate 11*b* and on the inside of the pair of tray guides 16, 16, a door 27 for closing the tray insertion/ejection port 15 is attached. The door 27 is a plate member which is elongated in the lateral direction and shafts 27*a*, 27*a* projecting outward in the longitudinal direction are provided under both ends. On the inside of the pair of tray guides 16, 16, a pair of bearings 28*a* and 28*b* are provided to swingably support the shafts 27*a*, 27*a*. Both ends of the door 27 are supported by the front plate 11*b* by the bearings 28*a* and 28*b* so as to be swingable.

Figure 13:
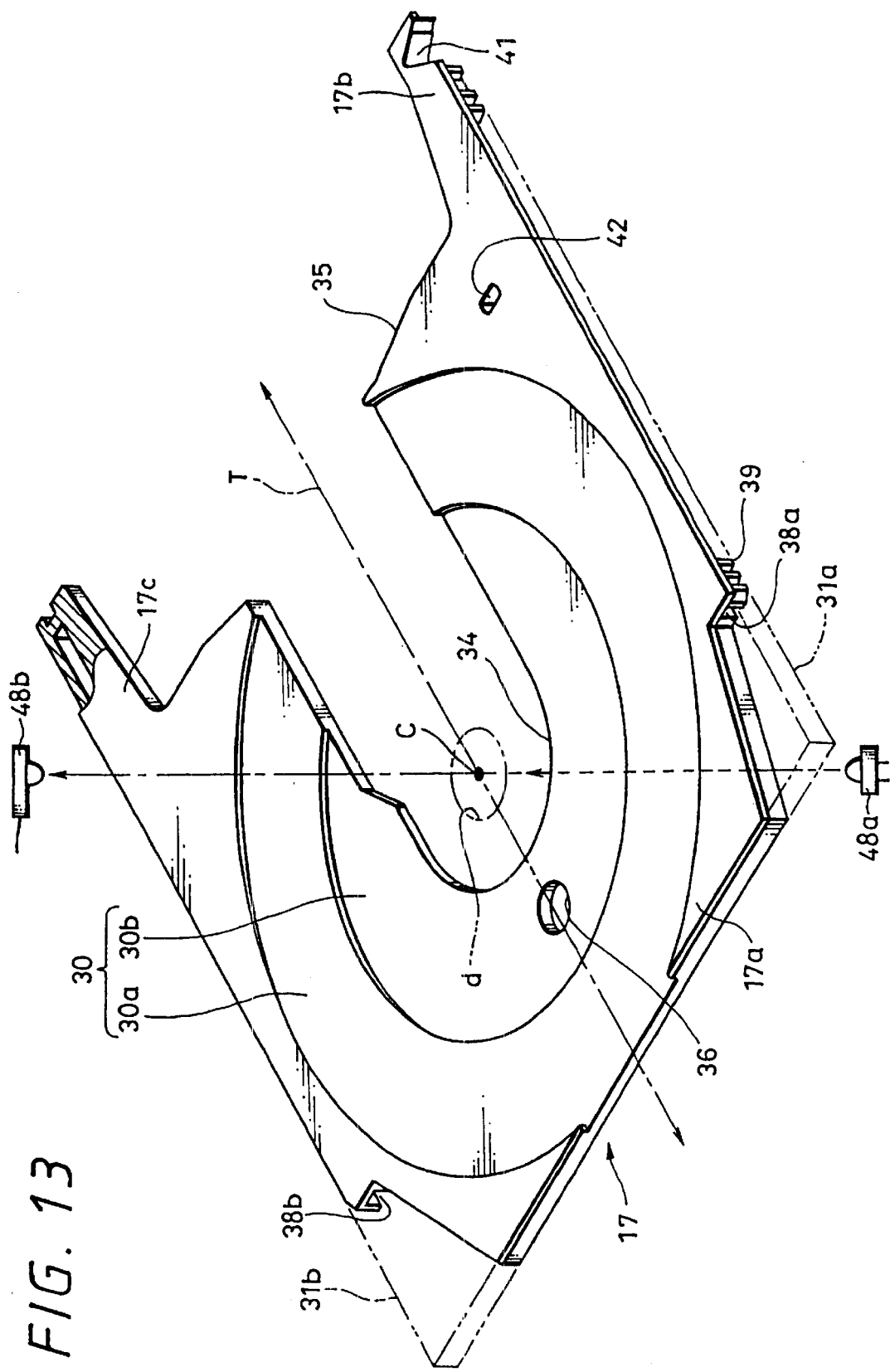
FIG. 13 is a perspective view showing the disc tray of the apparatus of the invention for recording and/or reproducing a disc-shaped recording medium.
Figure 14:
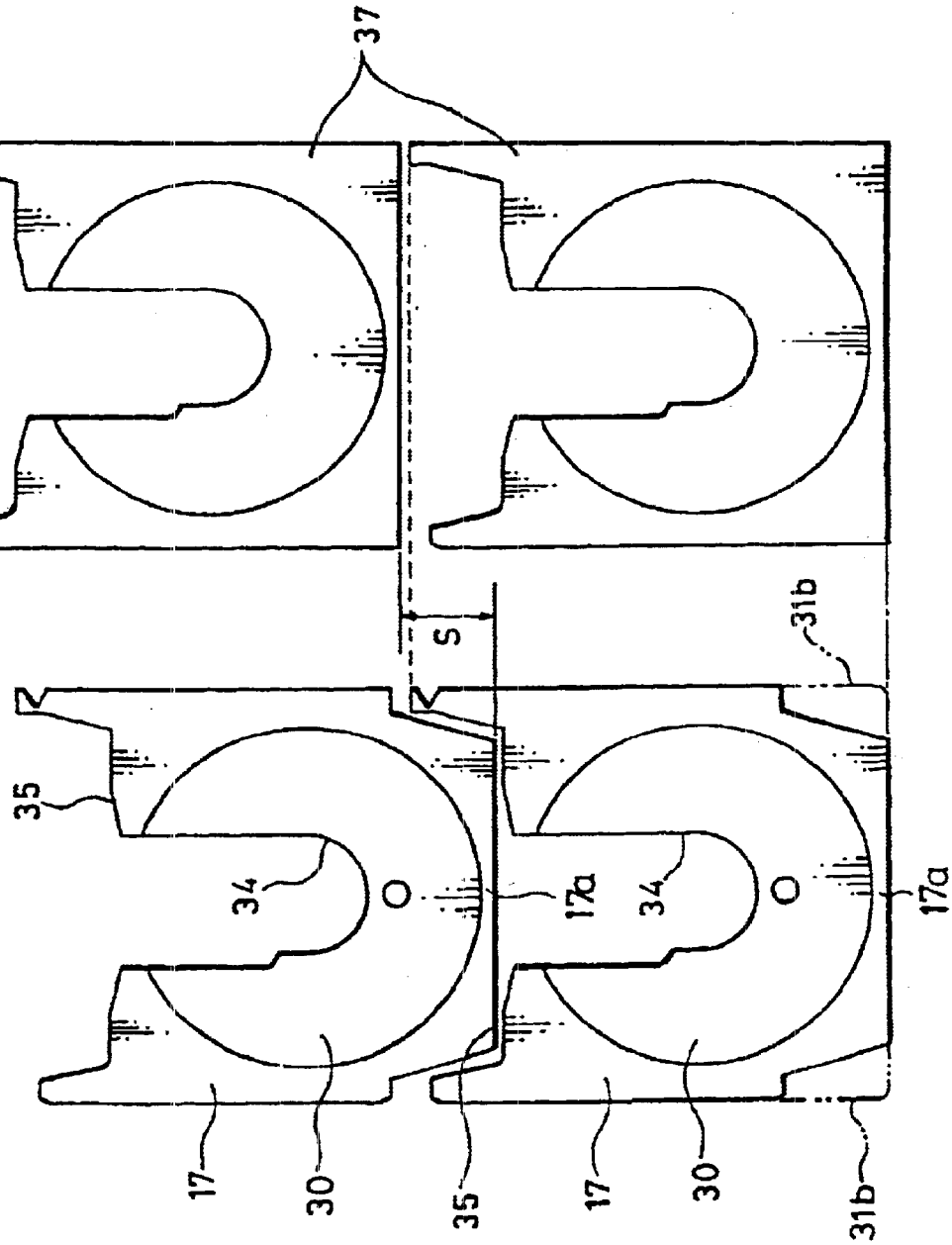
FIG. 14A is an explanatory diagram showing the disc trays of the apparatus of the invention for recording and/or reproducing a disc-shaped recording medium, so as to compare with conventional disc trays shown in FIG. 14B.

A coil spring 29 is attached to one of the shafts, 27*a*, of the door 27. By the spring force of the coil spring 29, the door 27 is energized and the tray insertion/ejection port 15 is closed by the door 27. The disc tray 17 inserted/ejected to/from the tray insertion/ejection port 15 is a plate member larger than the optical disc D used as shown in FIG. 13.

In the central part of the disc tray 17, for example, a disc placement part 30 having a recess 30*a* of a large diameter on which the optical disc D having a diameter of 12 cm is placed and a recess 30*b* of a small diameter on which the optical disc D having a diameter of 8 cm is placed. In the center of the front part of the disc tray 17, a central protruding part 17*a* of a trapezoid shape is created by forming rectangular notches 31*a* and 31*b* on both sides. On the side opposite to the central protruding part 17*a* of the disc tray 17, a pair of parts 17*b* and 17*c* to be supported, which project in parallel to each other to the outside with resect to the disc placement part 30 as a center are provided.

The disc tray 17 has an open hole 34 opened in a slit shape from the central part to the rear part of the disc placement part 30. A turntable 33 of the disc rotating device 13 and the like are inserted to the open hole 34. In the position where the disc tray 17 is housed in the tray stocker 12, the open hole 34 also serves as a path of light from a photodetector 48 for detecting whether the optical disc D is placed in the disc placement part 30 or not.

A clearance 35 is formed in a part which is surrounded by the rear part of the disc placement part 30 of the disc tray 17 and the pair of parts 17*b*, 17*c* to be supported extended on both ends. By the clearance 35, contact with a cam member, a gear, and the like which will be described hereinlater can be avoided. Further, when two disc trays 17 are arranged in the vertical direction, the central protruding part 17*a* of the other disc tray 17 can enter the clearance 35, thereby enabling the length in the vertical direction to be reduced.

Specifically, as shown in FIG. 14A, the central protruding part 17*a* of one disc tray 17 can enter the clearance 35 of the other disc tray 17. By arranging the two disc trays 17 in the vertical direction in such a manner, the length in the vertical direction of the whole can be shortened only by a distance S as compared with a case where two conventional disc trays 37 each having no notches on both sides of the front part are arranged only by the distance S, as shown in FIG. 14B. Consequently, the distance between a stock position where the disc tray 17 is stocked in the tray stocker 12 and a play position where the optical disc D placed on the disc tray 17 is loaded to the optical pickup device 14 is shortened to thereby shorten the length in the depth direction of the apparatus. Thus, the size of the whole apparatus can be reduced.

As shown in FIG. 13, a detection hole 36 for passing light used for disc detection by the photodetector 48 is opened in the front portion of the disc placement part 30 of the disc tray 17, which is the part where the detection light of the photodetector 48 passes, that is, on the path in the carrying direction T of the disc tray 17 passing the center point C or around it of the disc placement part 30. The detection hole 36 is used to detect whether the optical disc D is placed on the disc placement part 30 or not when the disc tray 17 is moved between the stock position and the play position.

In the embodiment, the detection hole 36 is provided in the recess 30*b* of a small diameter of the disc placement part 30. The detection hole 36 can be also formed in the recess 30*a* of a large diameter as long as it is on the path of the detection light. The size of the detection hole 36 is properly set in consideration of the moving speed of the disc tray 17, the light detection sensitivity of the photodetector 48, and the like.

On both edges in the direction which perpendicularly crosses the carrying direction T of the disc tray 17, guide grooves 38a and 38b which open on the under face side and extend straight in the longitudinal direction are formed. The guide grooves 38a and 38b have the role of regulating the lateral movement of the disc tray 17 to linearly insert/eject the disc tray 17 to/from the tray insertion/ejection port 15. At the time of ejection, the guide rails 16a, 16a of the pair of tray guides 16, 16 of the chassis 11 are slidable fit in the guide grooves 38a, 38b.

Further, on one of the edges of the disc tray 17, a rack 39 formed from the front end to the rear end of the part 17b to be supported is provided. Near the rear end of the part 17b to be supported, a V-shaped notch 41 is formed as a positioning part used for positioning by a slider 40 as a switching slider. Further, a lock hole 42 as a retained part for locking the disc tray 17 to prevent movement of the disc tray 17 is opened near the part 17b to be supported.

Figure 15:
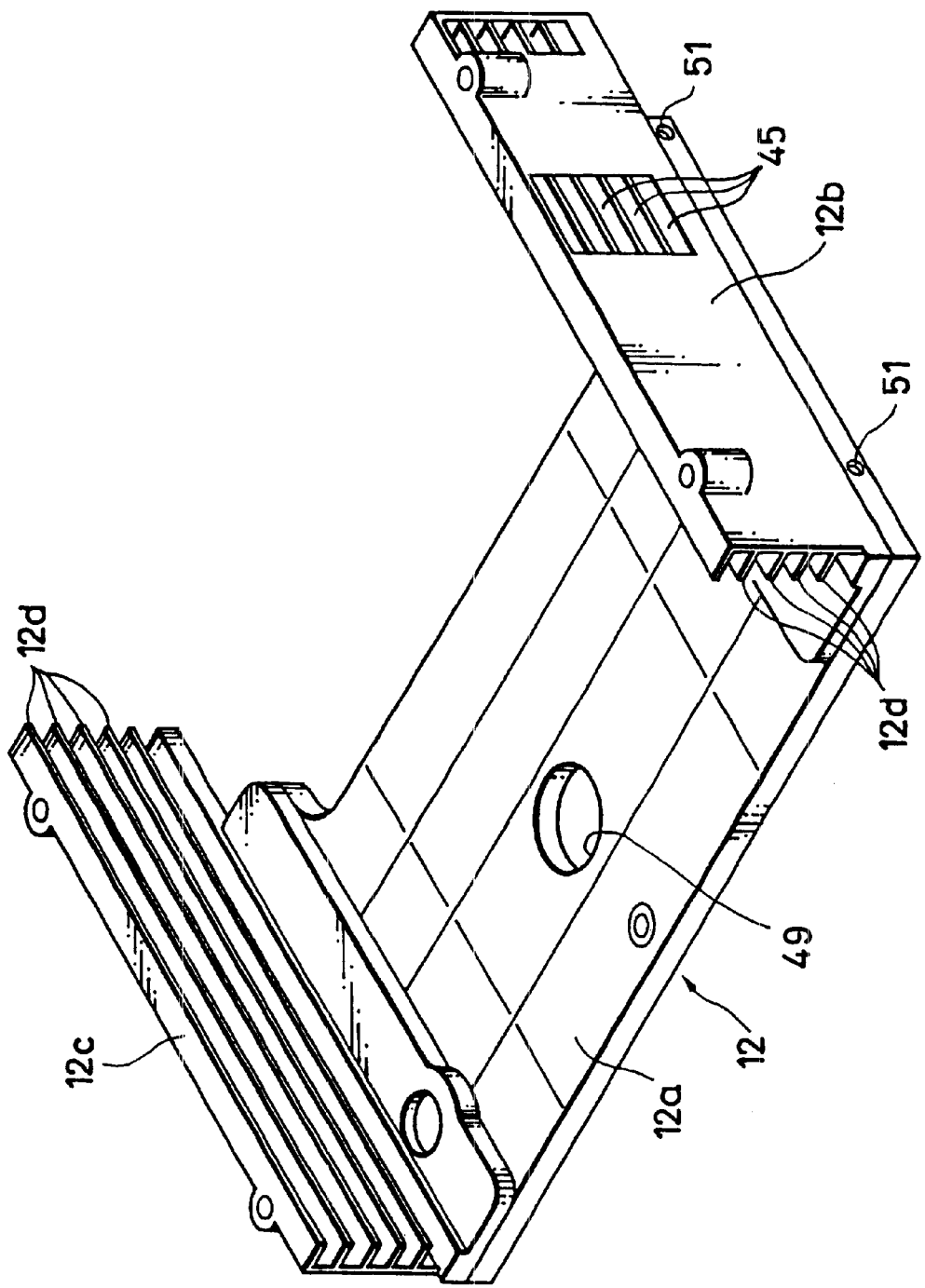
FIG. 15 is a perspective view showing a tray stocker of the apparatus of the invention for recording and/or reproducing a disc-shaped recording medium.

The five disc trays 17 each having the above construction are stacked so that information recording planes as main planes of the optical discs D placed on the disc placement parts 30 are almost in parallel to each other, and stocked in the tray stocker 12. As shown in FIG. 15, the tray stocker 12 has a base plate 12a formed slightly wider than the disc tray 17 and right and left side plates 12b and 12c attached upright on both sides in the width direction of the base plate 12a. As shown in FIG. 3, the right and left side plates 12b and 12c are fixed by fixing means such as fixing screws 43a integrally with the base plate 12a.

As shown in FIGS. 3 and 15, on the inside of the side plates 12b and 12c of the tray stocker 12, five shelf pieces 12d and 12d are provided at predetermined intervals in the vertical direction so as to be in parallel with each other. The top shelf piece 12d prevents the disc tray 17 stocked uppermost from being come off to the above. Between the neighboring shelf pieces 12d, 12d facing in both vertical and lateral directions and between the lowermost shelf piece and the bottom, a tray housing part is defined. Between the neighboring shelf pieces or between the shelf piece and the bottom, the right and left side edges of the disc tray 17 are placed to detachably hold the disc tray 17 in each tray housing part.

In one of the side plates, 12b, of the tray stocker 12, an open window 45 to which a central feed gear 44 as a feed gear to be engaged with the rack 39 of the disc tray 17 is inserted is opened. The open window 45 has a five-layer structure and is opened for each of the five tray housing parts. By inserting the central feed gear 44 via the corresponding hole into the tray housing part in accordance with the elevating position of the tray stocker 12, the central feed gear 44 comes into engagement with the rack 39 of the disc tray 17 held in the tray housing part.

As shown in FIGS. 3 and 5, a stopper plate 46 is attached to the front of the tray stocker 12 by fixing means such as fixing screws 43b. The stopper plate 46 regulates forward movement of the tray stocker 12. A top plate 47 is spanned between the right and left side plates 12b and 12c. The top plate 47 is fastened on the top of the side plates 12b and 12c by a plurality of fixing screws 43c.

Figure 7:
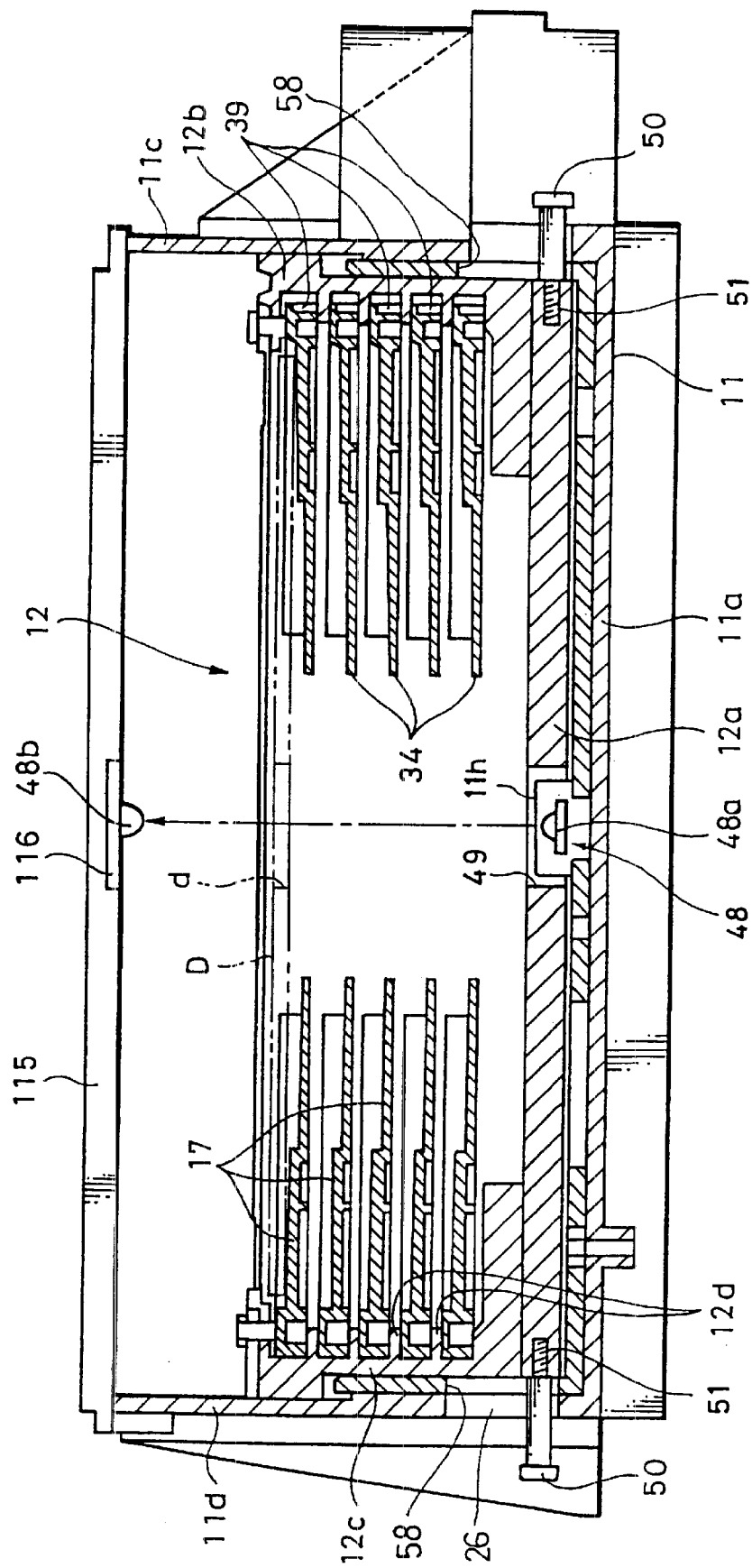
FIG. 7 is a cross section taken along Y—Y line of the apparatus for recording and/or reproducing a disc-shaped recording medium according to the invention shown in FIG. 4.

Further, as shown in FIG. 15, in an almost central part of the base plate 12a, a light passing hole 49 through which light of the photodetector 48 passes is formed. As shown in FIG. 7, a sensor holding part 11h provided on the bottom plate 11a of the chassis 11 is inserted to the light passing hole 49. As shown in FIG. 15, two screw holes 51 are provided with a predetermined gap in the longitudinal on each of both side faces of the base plate 12a. Screw parts of guide pins 50 are screwed in the screw holes 51. Total four guides pins 50 are projected two each on the right and left sides of the base plate 12a.

Figure 16:
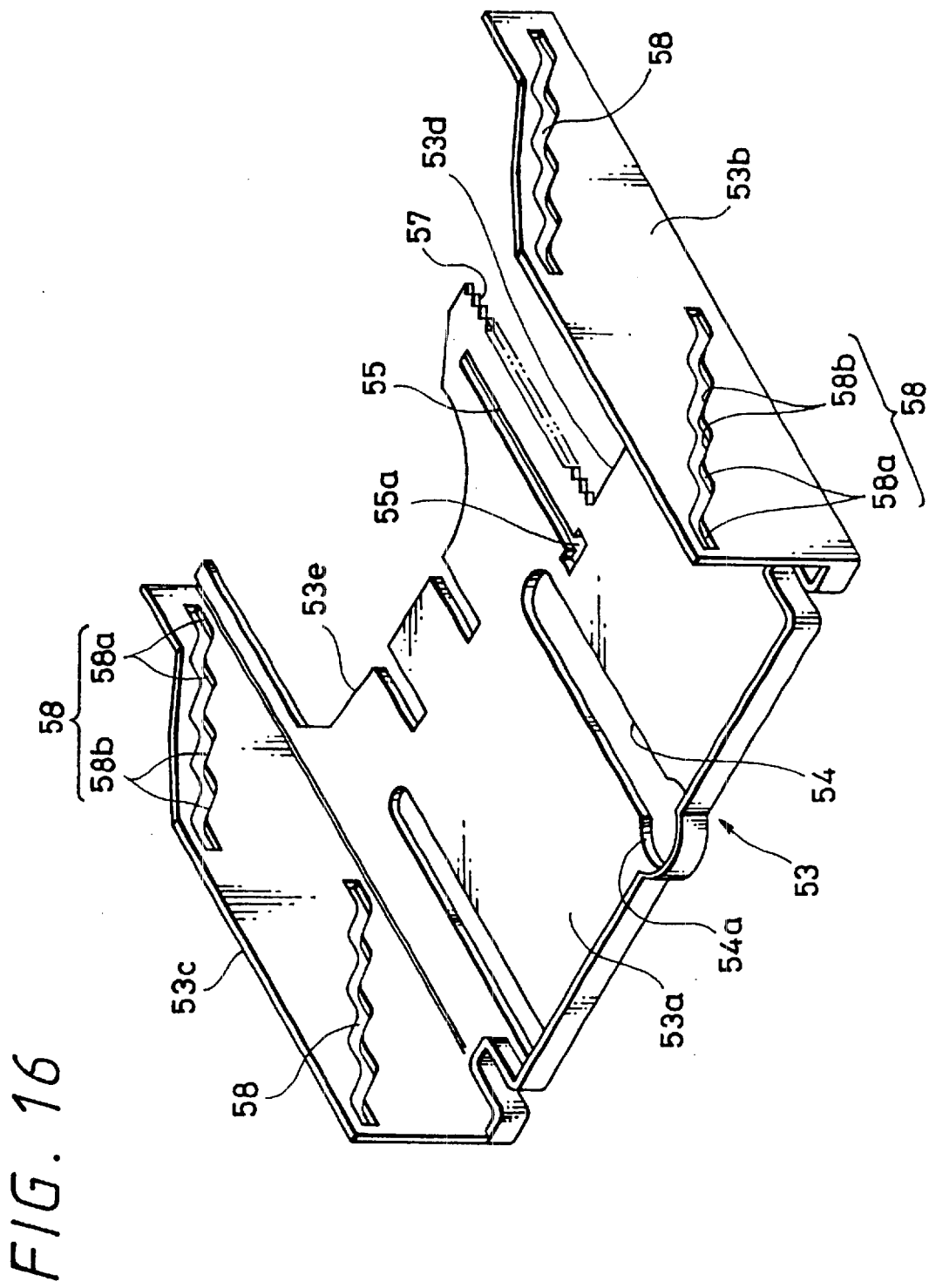
FIG. 16 is a perspective view showing a sliding member of the apparatus of the invention for recording and/or reproducing a disc-shaped recording medium.

The tray stocker 12 having such a construction is placed on a sliding member 53 as a slider for elevating the tray stocker 12 as a housing member. As shown in FIG. 16, the sliding member 53 has a bottom plate 53a formed slightly wider than the tray holder 12 and right and left side plates 53b and 53c extending upright from the right and left sides of the bottom plate 53a. In the bottom plate 53a of the sliding member 53, guide holes 54 and 55 for moving the sliding member 53 in the back and forth directions are opened. One of the two guide holes, 54, is formed in an almost center of the front part of the bottom plate 53a and the other guide hole 55 is formed in a position slightly offset to one side from the guide hole 54.

In the front portions of the guide holes 54 and 55, wide mouths 54a and 55a each for inserting the head of a member for preventing the sliding member 53 from being come off are formed. As shown in FIG. 5 and the like, the sensor holding part 11h provided for the bottom plate 11a of the chassis 11 is inserted to one of the guide holes, 54. A guide projection 11i provided for the bottom plate 11a is similarly inserted to the other guide hole 55. While being guided by the sensor holding part 11h and the guide projection 11i, the sliding member 53 is supported by the chassis 11 so as to be slidable in the longitudinal direction.

Further, as shown in FIG. 16, between the guide hole 55 and one of the side plates, 53b in the rear part of the bottom plate 11a of the chassis 11, a notch 53d extending in the longitudinal direction is formed. At one of the edges of the notch 53d, a rack 57 having teeth arranged in the longitudinal direction, which come into engagement with a drive gear 112 which will be described hereinlater is formed. A notch 53e for avoiding contact with a cam member and the like which will be described hereinlater is formed between the guide hole 55 and the other side plate 53c.

Each of the right and left side plates 53b and 53c of the sliding member 53 has two cam grooves 58, 58 for elevation which are formed with a predetermined gap in the longitudinal direction. The four cam grooves 58 for elevation are long stairlike holes having the same shape and size. The cam grooves 58 on the right side plate 53b and those on the left side plate 53c are arranged so as to face each other. The guide pins 50 fixedly screwed in the tray stocker 12 are slidably fit in the cam grooves 58 for elevation.

Each of the guide pins 50 is a screw member having a stepped shaft part. The shaft part slides along the cam groove 58 for elevation. The guide pins 50 penetrating the vertical grooves of the side mount base 25 are inserted in the front and rear cam grooves 58, 58 for elevation on one of the side plates, 53b. The guide pins 50 penetrating the vertical grooves 26, 26 formed in the other side plate 11d of the chassis 11 are inserted to in the front and rear cam grooves 58, 58 for elevation of the other side plate 53c.

Each cam groove 58 for elevation has five horizontal parts 58a formed at predetermined intervals in the vertical direction and four inclined parts 58b communicating the neighboring upper and lower horizontal parts 58a. The five horizontal parts 58a are formed so that their height corresponds to the five tray housing parts of the tray stocker 12. The tray insertion/ejection port 15 is formed in correspondence with the height of the tray stocker 12.

To be specific, when the four guide pins 50 inserted to the cam grooves 58 for elevation are on the lowermost horizontal part 58a, the uppermost tray housing part of the tray stocker 12 and the tray insertion/ejection port 15 are set to have almost the same height. When the four guide pins 50 move to the fifth horizontal part 58a which is the uppermost, the tray stocker 12 is lifted only by a predetermined amount and the first tray housing part as the lowermost part coincides with the tray insertion/ejection port 15.

Such an operation of elevating the tray stocker 12 is realized by a synergistic effect among the two vertical grooves 26, 26 formed in one of the side plates, 11d, of the chassis 11, the two vertical grooves formed in the side mount base 25, and the four cam grooves 58, 58 for elevation formed in the sliding member 53. Specifically, the tray stocker 12 is supported by the four vertical grooves so as to be movable only in the vertical direction with respect to the chassis 1 and the sliding member 53 is supported so as to be movable only in the longitudinal direction with respect to the chassis 11. By moving the sliding member 53 in the longitudinal direction, the tray stocker 12 is moved vertically by the operation of the stocker elevating mechanism comprising the vertical grooves 26, 26, guide pins 50, 50, and cam grooves 58, 58 for elevation.

The side mount base 25 for inserting/ejecting the disc tray 17 housed in the tray stocker 12 to/from the tray insertion/ejection port 15 is provided with a tray carrying mechanism 60 as a carrying mechanism for moving the disc tray 17. The tray carrying mechanism 60 moves the disc tray 17 among an ejection position where the optical disc D can be loaded or ejected to/from the disc tray 17, a stock position where the disc tray 17 is housed in the tray stocker 12, and a play position where the optical disc D is loaded in the recording and/or reproducing unit.

The tray carrying mechanism 60 as a component of a disc tray carrying system has a construction as illustrated in FIGS. 2, 5, and so on. Specifically, the tray carrying mechanism 60 comprises a driving motor 61 as a drive source, a rubber belt type speed reducing mechanism 62 for increasing a transmission torque by reducing the rotational speed of the driving motor 61, and three feed gears 23, 44, and 63 rotated by the torque transmitted from the rubber belt speed reducing mechanism 62.

Figure 18:
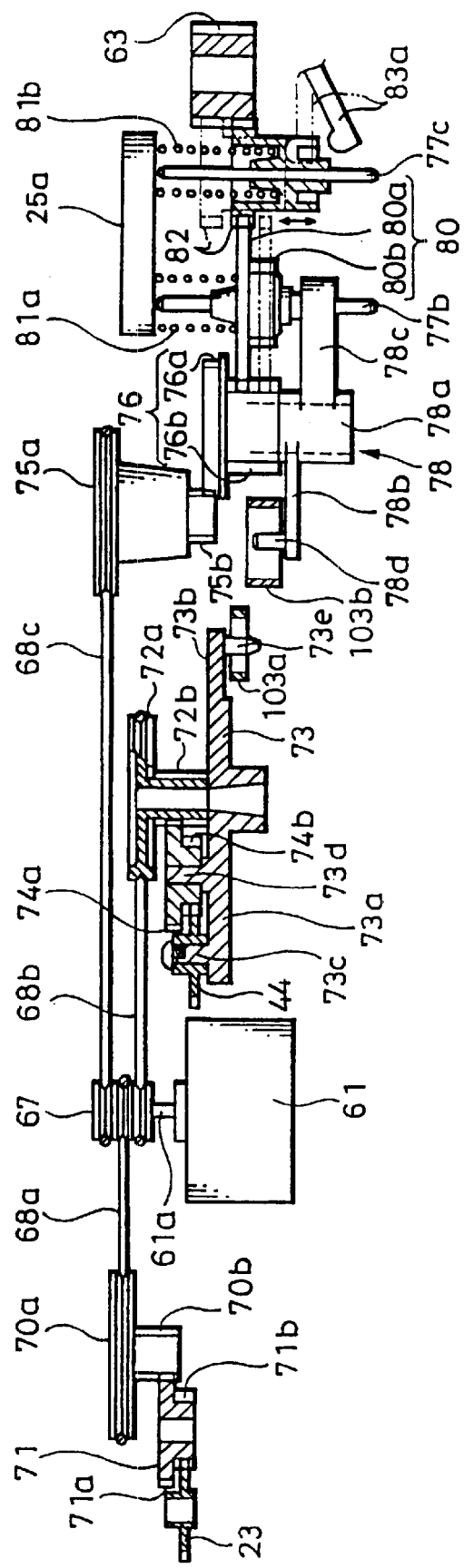
FIG. 18 is a partly sectional side view showing a power transmitting path of a disc tray carrying system of the apparatus of the invention for recording and/or reproducing the disc-shaped recording medium.

As shown in FIG. 2 and so on, the driving motor 61 of the tray carrying mechanism 60 is fixed to the side mount base 25. The rotary shaft 61a of the driving motor 61 penetrates the fixed plate 25a and is projected upward. A driving pulley 67 is attached to the rotary shaft 61a. As shown in FIG. 18, the driving pulley 67 has three belt retaining parts provided with predetermined intervals in the axial direction. Endless rubber belts 68a, 68b, and 68c as power transmitting media are run over the belt retaining parts of the driving pulley 67.

The first rubber belt 68a run over the central belt retaining part of the driving pulley 67 extends to the front side of the chassis 11 and runs over a front driven pulley 70a. The second rubber belt 68b run over the lower belt retaining part of the driving pulley 67 extends to the rear side of the chassis 11 and runs over a central driven pulley 72a. Further, the third rubber belt 68c run over the upper belt retaining part of the driving pulley 67 extends to the rear side of the chassis 11 and runs over a rear driven pulley 75a.

Figure 10:
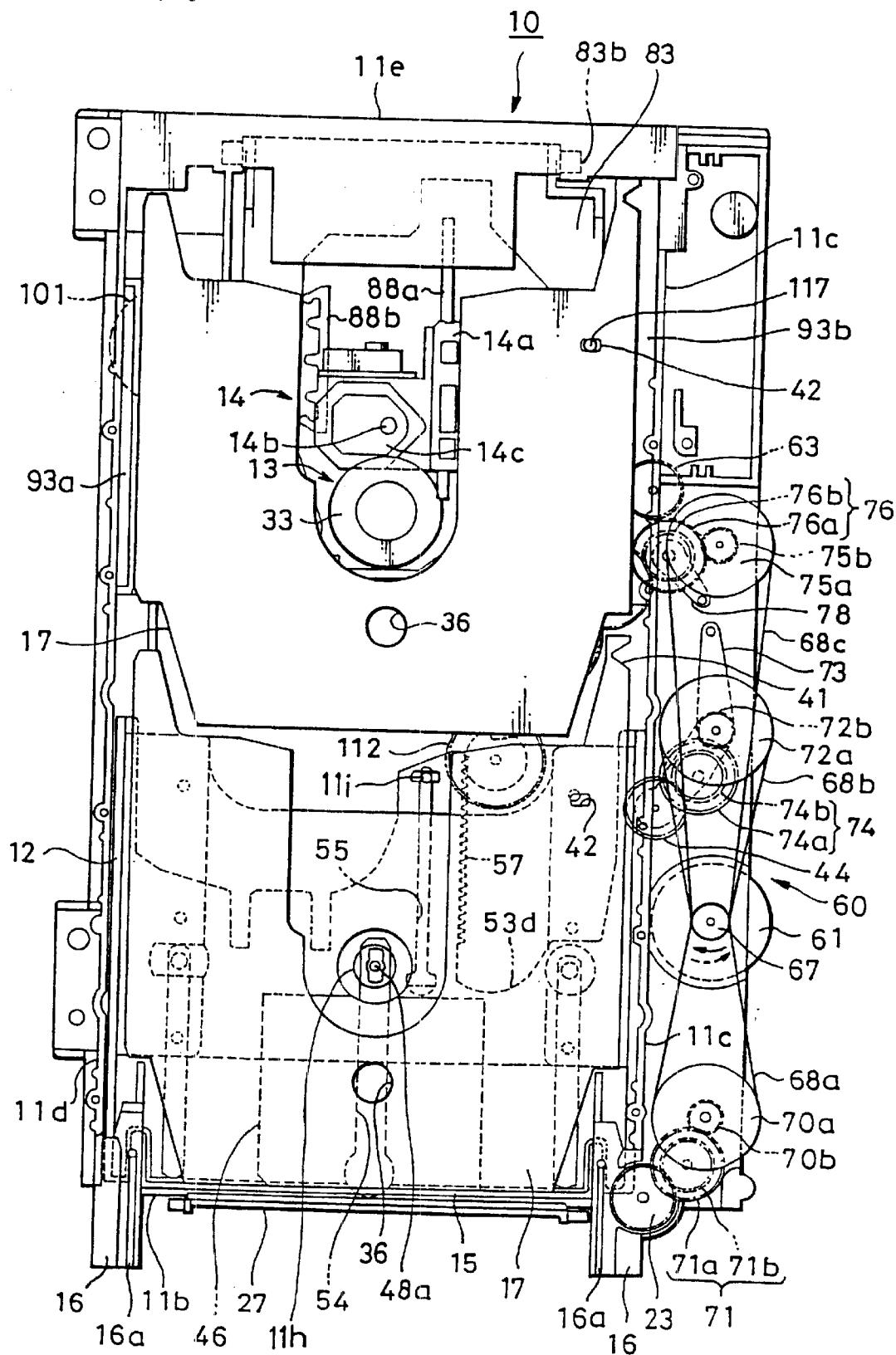
FIG. 10 is a plan view showing a state where the disc tray of the apparatus of the invention for recording and/or reproducing a disc-shaped recording medium is moved to a position where the disc-shaped recording medium placed on the disc tray is loaded into a recording and/or reproducing unit.

As shown in FIGS. 5, 9, and 10, the front driven pulley 70a is rotatably supported by the supporting shaft 69a upright in the front part of the side mount base 25. The front driven pulley 70a is integrally provided with a front output gear 70b which engages with a large diameter part 71a of the front intermediate gear 71. The front intermediate gear 71 has a small diameter part 71b provided integrally with the large diameter part 71a and is rotatably supported by the supporting shaft 69b upright on the front side of the supporting shaft 69a. The above-mentioned front feed gear 23 is in engagement with the small diameter part 71b of the front intermediate gear 71.

The central driven pulley 72a is rotatably supported by the supporting shaft 69c upright in the intermediate part of the side mount base 25. A swing arm 23 as an arm part rotatably similarly supported by the supporting shaft 69c is disposed below a central driven pulley 72a. On the swing arm 73, a central output gear 72b provided integrally with the central driven pulley 72a is placed.

Figure 17:
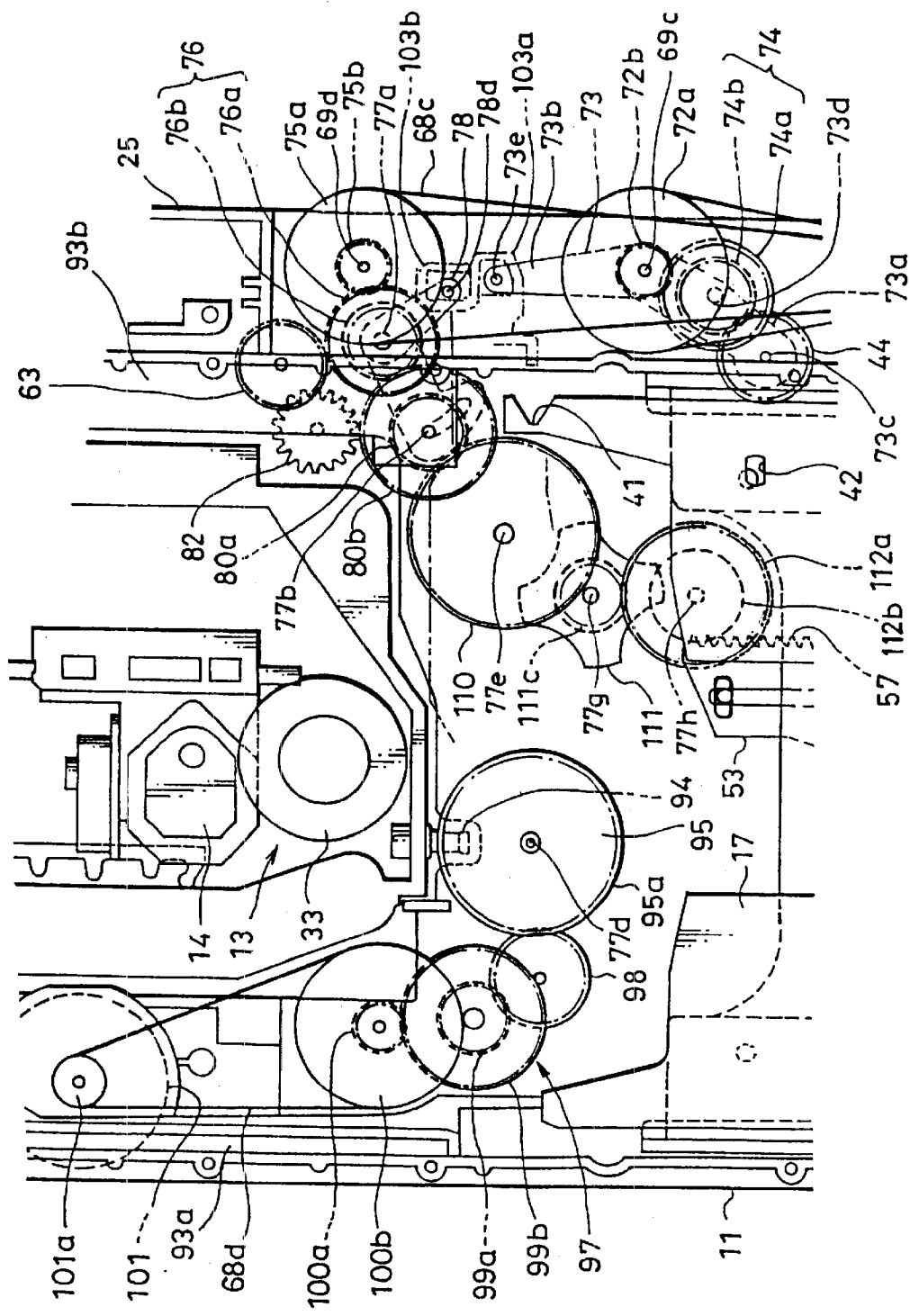
FIG. 17 is a plan view showing a power transmitting path of the apparatus of the invention for recording and/or reproducing a disc-shaped recording medium.

A large diameter part 74a of a central intermediate gear 74 engages with the central output gear 72b. The large diameter part 74a is integrally provided with a small diameter part 74b. The above-mentioned central feed gear 44 engages with the small diameter part 74b of the central intermediate gear 74. The central feed gear 44 and the central intermediate gear 74 are rotatably supported by shafts 73c and 73d formed upright in one of the arm members, 73a, of the swing arm 73 as shown in FIGS. 17 and 18. The central feed gear 44 and the central intermediate gear 74 therefore rotate around the central output gear 72b by the swinging operation of the swing arm 73.

When the swing arm 73 swings clockwise in FIG. 17, the central feed gear 44 enters the tray housing part from the open window 45 formed in the tray stocker 12. As a result, when the disc tray 17 is housed in the corresponding tray housing part, the central feed gear 44 comes into engagement with the rack 39 of the disc tray 17. The other arm member 73b of the swing arm 73 is provided with an operation pin 73e protruding downward.

The rear driven pulley 75a is rotatably supported by the supporting shaft 69c provided upright on the rear side of the side mount base 25. The rear driven pulley 75a is integrally provided with a rear output gear 75b. A large diameter part 76a of a rear intermediate gear 76 engages with the rear output gear 75b. The large diameter part 76a of the rear intermediate gear 76 is integrally provided with a small diameter part 76b.

The rear intermediate gear 76 is rotatably supported by a supporting shaft 77a provided upright in the chassis 11. Below the rear intermediate gear 76, a stepped switching lever 78 similarly rotatably supported by the supporting shaft 77a is disposed. On the stepped switching lever 78, the small diameter part 76b of the rear intermediate gear 76 is placed.

Figure 22:
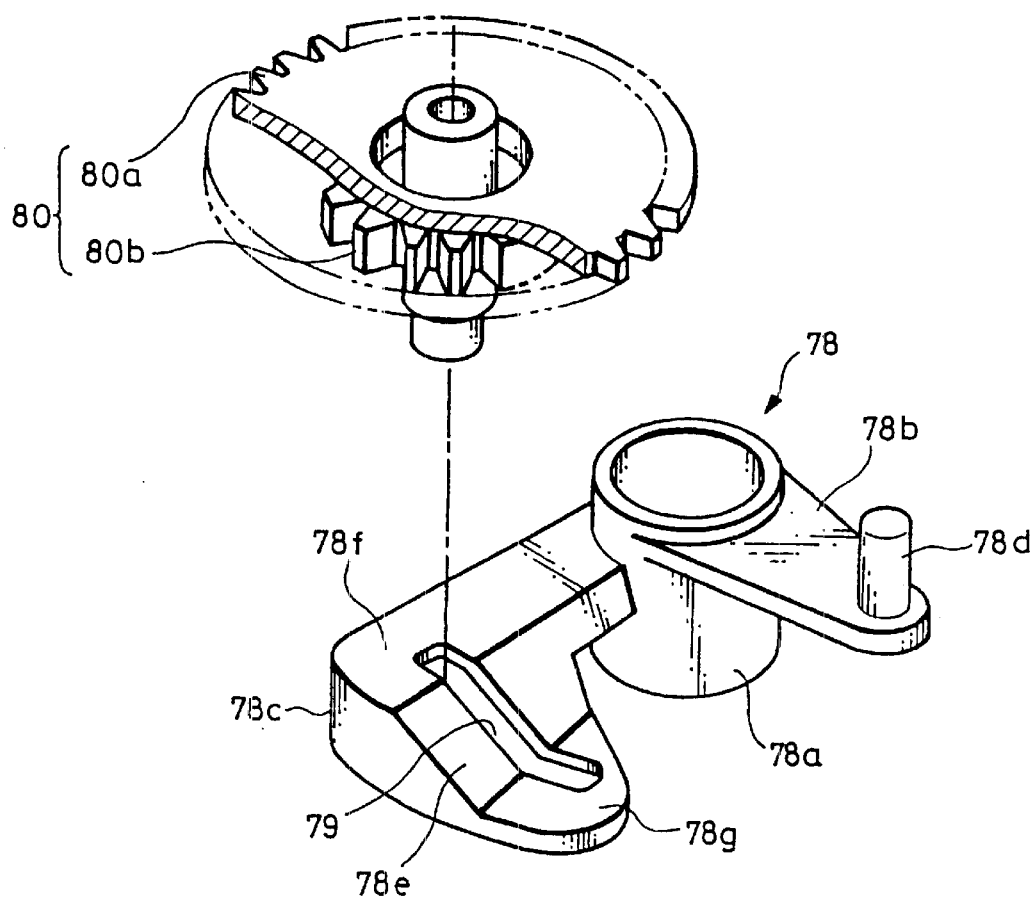
FIG. 22 is a partly sectional perspective view of a stepped switching lever and an elevating gear of the apparatus of the invention for recording and/or reproducing a disc-shaped recording medium.

The stepped switching lever 78 has, as shown in FIG. 22, a cylindrical shaft 78a and two arms 78b and 78c projected from the cylindrical shaft 78a. The first arm 78b is provided with an operation pin 78d projected upward and the second arm 78c is provided with an inclined face 78e which is radially inclined. An upper face 78f and a lower face 78g are set on both sides of the inclination direction of the inclined face 78e, thereby forming a step of a predetermined height. In the inclined face 78e, a long hole 79 extending in the inclination direction between the upper face 78f and the lower face 78g is formed.

Figure 21:
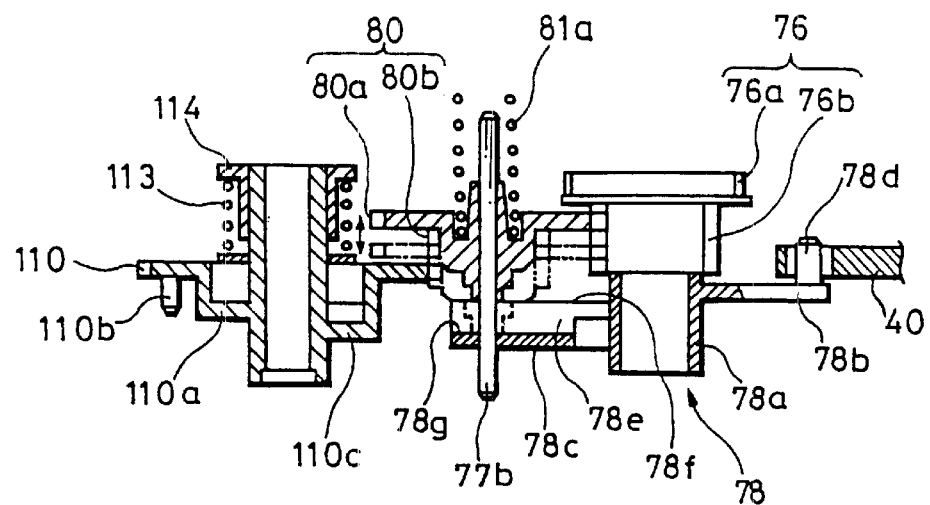
FIG. 21 is a cross section showing a main part of the power transmitting path in the disc tray carrying system of the apparatus of the invention for recording and/or reproducing a disc-shaped recording medium.

The long hole 79 of the stepped switching lever 78 has a circular shape around the axis of the cylindrical part 78a as a center. As shown in FIG. 21, a supporting shaft 77b provided upright in the chassis 11 is slidably inserted to the long hole 79. An elevating gear 80 as a moving gear is rotatably supported by the supporting shaft 77b. The elevating gear 80 is energized toward the second arm 78c by the spring force of a coil spring 81a. The elevating gear 80 has a large diameter part 80a to be engaged with the small diameter part 76b of the rear intermediate gear 76 and a small diameter part 80b integrally provided under the large diameter part 80a.

The elevating gear 80 moves up or down along the inclined face 78e against the energization force of the coil spring 81a by the swing of the stepped switching lever 78. As a result, the elevating gear 80 can be moved onto the upper face 78f (first position) and the lower face 78g (second position). Before and after the elevating operation, as shown in FIGS. 18 and 21, the large diameter part 80a of the elevating gear 80 always engages with the small diameter part 76b of the rear intermediate gear 76.

As illustrated in FIG. 18, a movable gear 82 detachably engages with the large diameter part 80a of the elevating gear 80. The movable gear 82 is rotatably supported by a supporting shaft 77c provided upright on the chassis 11 and is energized toward the bottom plate 11a of the chassis 11 by the spring force of a coil spring 81b. Below the movable gear 82, an operation arm 83a provided for a swing frame 83 which will be described hereinlater is disposed so as to face the movable gear 82. The operation arm 83a swings vertically, thereby moving the movable gear 82 up or down against the energization force of the coil spring 81b.

Before and after the elevating operation, when the elevating gear 80 moves upward and is in the first position, the movable gear 82 engages with the large diameter part 80a. When the elevating gear 80 moves downward and is in the second position, the engagement with the large diameter part 80a is cancelled. The movable gear 82 engages with a rear feed gear 63 as another feed gear. The rear feed gear 63 is rotatably supported by the side mount base 25 and thickly formed so as to always engage with the movable gear 82 before and after the elevating operation of the movable gear 82. The other ends of the two coil springs 81s and 81b are connected to a spring bracket 25a provided for the side mount base 25.

In FIGS. 5, 9, and 10, therefore, when the driving motor 61 rotates clockwise as shown by the arrow of a solid line, the three driven pulleys 70a, 72a, and 75a are rotated clockwise by the driving pulley 67 via the three rubber belts 68a to 68c. Consequently, in the front carrying part to which the torque is transmitted from the front driven pulley 70a, the front feed gear 23 is rotated clockwise via the output gear 70b and an intermediate gear 71. In the central carrying part where the torque is transmitted from the central driven pulley 72a, the central feed gear 44 is rotated clockwise via the output gear 72b and the intermediate gear 74. Further, in the rear carrying part where the torque is transmitted from the rear driven pulley 75a, the rear feed gear 63 is similarly rotated clockwise via the output gear 75b, intermediate gear 76, elevating gear 80 (the large diameter part 80a and the small diameter part 80b), and movable gear 82.

At this time, since the front feed gear 23 in the front carrying part and the central feed gear 44 in the central carrying part are directly connected to the output gears 70b and 72b, respectively, both of the feed gears 23 and 44 are always rotated. On the other hand, in the rear carrying part, since the elevating gear 80 and the movable gear 82 are constructed to be disengageable, the rear feed gear 63 is either rotated or stopped according to the engagement/disengagement.

Since the front and rear feed gears 23 and 63 are supported in the predetermined positions in the chassis 1 and positioned on the path of the rack 39 formed in the disc tray 17, when the disc tray 17 is moved to the position, the front and rear feed gears 23 and 63 always come into engagement with the rack 39. On the other hand, since the central feed gear 44 is supported by the swing arm 73, the central feed gear 44 projects onto the path of the rack 39 in accordance with the swing operation of the swing arm 73. Only at that time, the central feed gear 44 comes into engagement with the rack 39.

On the rear side of the tray stocker 12 in which a plurality of disc trays 17 inserted/ejected by the tray carrying mechanism 60 having such a construction are housed, the swing frame 83 swingably supported by the chassis 11 is disposed.

Figure 8:
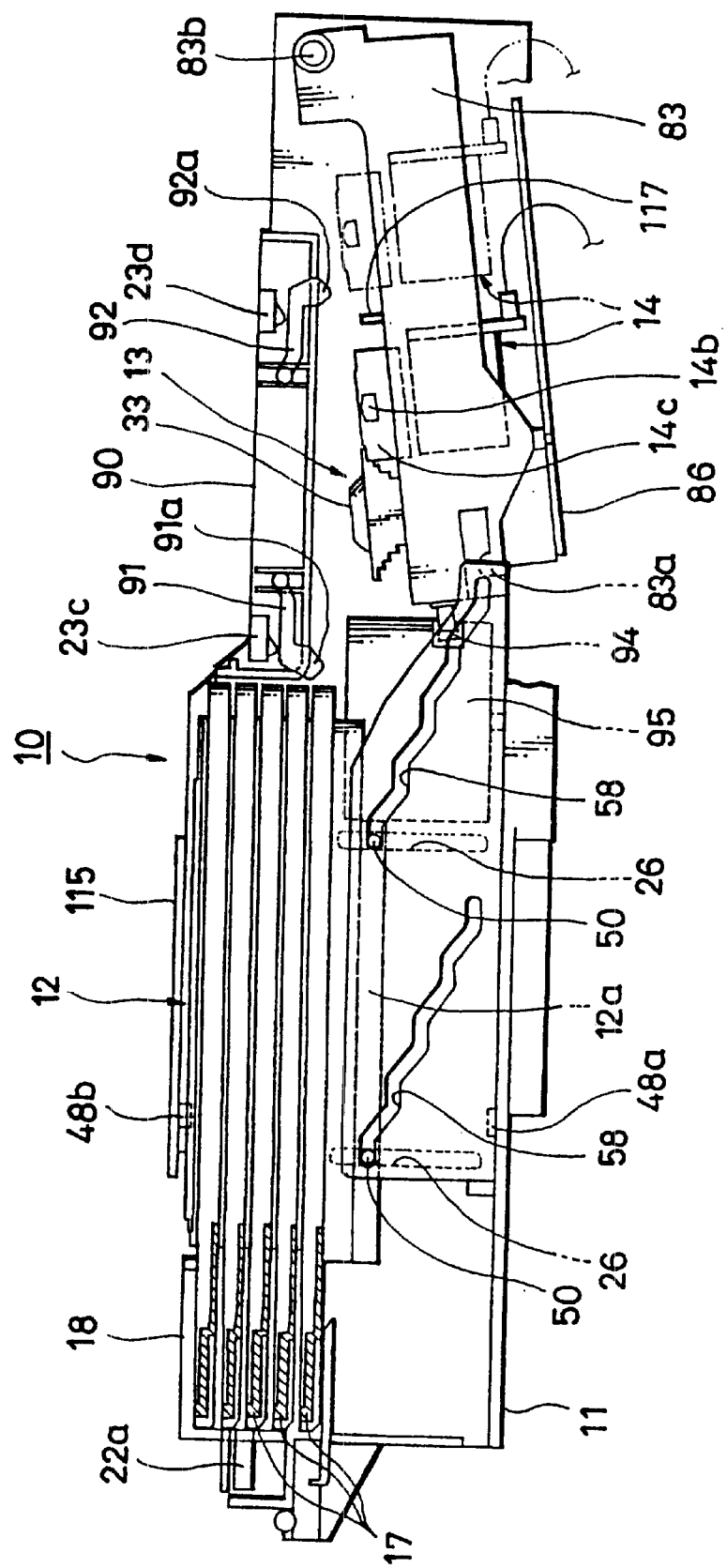
FIG. 8 is a vertical section showing a state where the tray stocker of the apparatus of the invention for recording and/or reproducing a disc-shaped recording medium is elevated to the uppermost stage.

As shown in FIGS. 2 to 5, the swing frame 83 is a frame member having an almost square shape. As shown in FIGS. 6, 8, and 11, the operation arm 83a is provided so as to project from the front lower part of one of the side faces of the swing frame 83. A rotary shaft 83b as a rotation center with respect to the chassis 11 is provided in the rear upper part of both sides of the swing frame 83. The rotary shaft 83b is rotatably supported by a bearing supporting part provided for the chassis 11. The swing frame 83 is swingable so that its front side is lower with respect to the chassis 11.

Further, as shown in FIG. 4, on the swing frame 83, a lock pin 117 as a fitting projection protruding upward is provided. The lock pin 117 is fit in the lock hole 42 as a part to be fitted in the disc tray 17 at the time of chucking, thereby locking the disc tray 17 and preventing the movement of the disc tray 17. The fitting part and the part to be fitted can be provided in a manner opposite to the embodiment that the lock pin is provided for the disc tray 17 and the lock hole is formed in the swing frame 83.

In order to assure the inclining operation of the swing frame 83, as shown in FIG. 3 and the like, an open window 84 slightly larger than the swing frame 83 is opened in the bottom plate 11a of the chassis 11. Only when the front side of the swing frame 83 is inclined downward, that is, only in the state before the chucking, the front lower part of the swing frame 83 is projected downward from the open window 84. In the swing frame 83, a sub-chassis 86 is elastically supported via four damper members 85. On the sub-chassis 86, the disc rotating device 13 and the optical pickup device 14 are mounted.

The damper member 85 is a hollow gourd-shaped cylindrical body made of a rubber-like elastic material. By elastically supporting the sub-chassis 86 by the four damper members 85, the vibration on the chassis 11 side is prevented from being transmitted to the disc rotating device 13 and the like. The disc rotating device 13 has a spindle motor 87 fixed to the front part of the sub-chassis 86. A turntable 33 is attached to the tip of a rotary shaft provided upright on the spindle motor 87. The turntable 33 is set so as to be almost parallel to the top face of the sub-chassis 86. A centering guide to be fit in the central hole (d) of the optical disc D is provided in the center of the top face of the turntable 33.

As shown in FIG. 5 and the like, behind the spindle motor 87, the optical pickup device 14 is guided by a guide shaft 88a and a guide plate 88b and supported so as to be movable in the longitudinal direction. The guide shaft 88a and the guide plate 88b are fixed to the sub-chassis 86 so as to be parallel to each other. A carriage 14a is slidably supported by the guide shaft 88a and the guide plate 88b and the optical pickup device 14 can be moved so as to be close to or apart from the turntable 33 via the sliding operation of the carriage 14a.

On the carriage 14a of the optical pickup device 14, an optical head 14c on which an objective lens 14b is installed so as to face upward is mounted. A laser beam emitted from the objective lens 14b is applied to the information recording face of the optical disc D chucked by the turntable 33 and the laser beam reflected by the information recording face enters the optical head 14c via the objective lens 14b. The center of each of the objective lens 14b and the turntable 33 is set on the path of the center of the disc tray 17. The objective lens 14b is movable in the radial direction of the optical disc D in the rear part of the optical disc D placed on the turntable 33.

As shown in FIGS. 2, 12 and so on, a disc clamper 89 for sandwiching the optical disc D with the turntable 33 so as to be integrally rotatable is disposed above the turntable 33. The disc clamper 89 is held by a rear mount base 90 with a predetermined play in each of the vertical, lateral, and longitudinal directions, which is provided so as to cover the swing frame 83. The rear mount base 90 is attached across the right and left side plates 11c and 11d in the rear part of the chassis 11 and is fixed by a plurality of fixing screws 19a.

The disc damper 89 is attached in an almost center part of the rear mount base 90. The disc damper 89 has a cylindrical shaft extending through a hole formed in the rear mount base 90, a flange-shaped presser plate provided at the lower end of the cylindrical shaft, and a mounting plate detachably attached to the upper end of the cylindrical shaft. A magnet for chucking is housed in the cylindrical shaft, so that the disc damper 89 is attracted by the turntable 33 by the attraction force of the magnet. Consequently, the optical disc D placed on the turntable 33 is sandwiched by the disc clamper 89 and the turntable 33 and rotated in the chucked state.

As shown in FIG. 5 and so on, on one of the sides of the rear mount base 90, a front detection arm 91 and a rear detection arm 92 for detecting whether or not the disc tray 17 is moved to the play position where the information signal is recorded and/or reproduced are attached swingably in the vertical direction. The detection arms 91 and 92 have input parts 91a and 92a projected onto the path of the disc tray 17 and the detection switches 22c and 22d are disposed on the side opposite to the input parts 91a and 92a, respectively. By turning on (or off) the corresponding detection switch 22c or 22d by pushing up the detection arm 91 or 92 by the disc tray 17, it can be detected that the disc tray 17 passes through the position where the switch is attached.

Further, on the inner face of one of the side plates, 11d, of the chassis 11 and the inner face of the side mount base 25, rear guide rails 93a ad 93b for supporting the disc tray 17 from both sides, which is carried from the rear side of the tracy stocker 12 to the turntable 33 side are provided. The height of the rear guide rails 93a and 93b is set to be almost the same as that of the tray insertion/ejection port 15 surrounded by the pair of tray guides 16, 16 and the tray pressers 18a and 18b.

As shown in FIGS. 5, 6 and so on, a cam pin 94 protruding forward is provided in the upper central part of the front face of the swing frame 83. In order to reduce the slide frictional resistance, the tip of the cam pin 94 is formed in a spherical shape. The cam pin 94 is slidably fit in a cam groove 96 of a cam member 95 disposed in front of the cam pin 94.

Figure 19:
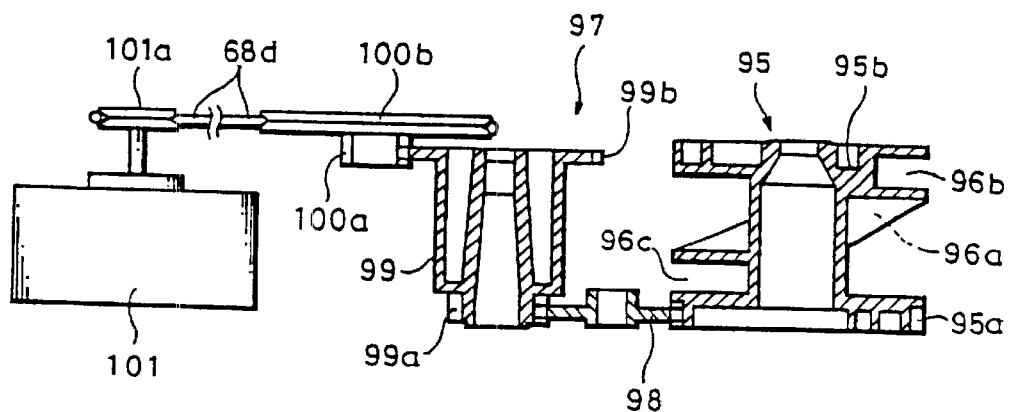
FIG. 19 is a partly sectional side view showing the power transmitting path of a chucking operation system of the apparatus of the invention for recording and/or reproducing a disc-shaped recording medium.

As shown in FIGS. 4, 19 and so on, the cam member 95 is a rotating member having the cam groove 96 spirally extending on the periphery. A cam gear 95a is provided at the lower end of the cam member 95 and a end face cam 95b is provided on the top face. The cam groove 96 of the cam member 95 has an inclined part 96a inclined at a predetermined angle and an upper horizontal part 96b and a lower horizontal part 96c which are continuous on both sides of the inclined part 96a.

The inclined part 96a in the cam groove 96 is a long groove whose right side is lower. In a higher position on the left side of the inclined part 96a, the upper horizontal part 96b is formed. In a lower position on the right side of the inclined part 96a, the lower horizontal part 96c is formed. The upper horizontal part 96b of the cam groove 96 is set in a position as high as the swing frame 83 in a horizontal state. As shown in FIGS. 11 and 12, when the swing frame 83 is in the horizontal state, the optical disc D on the disc tray 17 is lifted by the turntable 33 of the optical pickup device 14.

The swing frame 83 is moved up or down by the cam member 95. As shown in FIGS. 6 and 8, the swing frame 83 is swung so that its front side is lowered only by an amount corresponding to the difference between the upper and lower horizontal parts 96b and 96c. The inclined state where the front side of the swing frame 83 is lower corresponds to the position where the turntable 33 is lower than the disc tray 17. The cam member 95 for swinging the swing frame 83 is rotatably supported by the supporting shaft 77d in a state where the cam gear 95a is disposed below. The support shaft 77d is provided upright on the bottom plate 11a of the chassis 11 as shown in FIG. 3.

Further, as shown in FIGS. 17 and 19, an output gear 98 positioning at the end of the power transmitting path in a cam driving mechanism 97 of the chucking operation system meshes with the cam gear 95a of the cam member 95. The output gear 98 meshes with a small diameter part 99a of an intermediate gear 99. The small diameter part 99a is integrally provided with a large diameter part 99b. A driving gear 100a engages with the large diameter part 99b of the intermediate gear 99.

The driving gear 100a is integrally provided with a driven pulley 100b. The endless rubber belt 68d runs over the driven pulley 100b, extends rearward and runs over a driving pulley 101a. The driving pulley 101a is fixed to the rotary shaft of a cam driving motor 101. The cam driving motor 101 is fixed on the inside of the side plate 11d of the chassis 11. The driving gear 100a, intermediate gear 99, and output gear 98 are rotatably supported by the supporting shafts provided upright on the bottom plate 11a.

Figure 20:
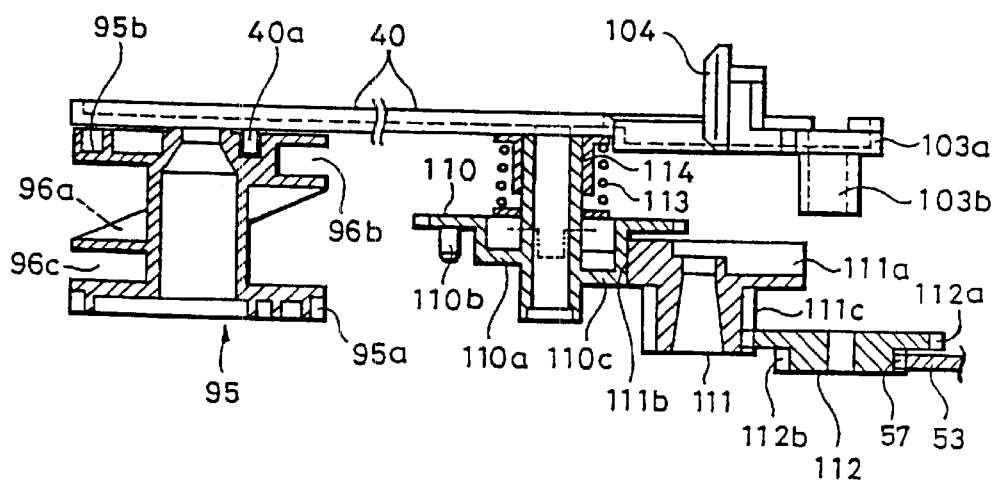
FIG. 20 is a partly sectional side view showing the power transmitting path of a sliding member driving system of the apparatus of the invention for recording and/or reproducing a disc-shaped recording medium.

As shown in FIG. 4 and so on, the end face cam 95b provided on the top face of the cam member 95 is an annular groove deviated to one side with respect to the rotation center of the cam member 95 as a center. A stroke of a predetermined distance is set according to a displacement amount in the radial direction of the end face cam 95b. As shown in FIG. 20, a projection 40a from the back face of the slider 40 is slidably fit in the end face cam 95b.

The slider 40 is a plate member which is long in the lateral direction as shown in FIGS. 3 to 5. Two long holes 40b and 40c extending in the lateral direction with a predetermined interval in the longitudinal direction are opened in the slider 40. One of the long holes, 40b, of the slider 40 faces the top of the supporting shaft 77d for supporting the cam member 95. The slider 40 is prevented from being come off by an attaching screw 102a screwed in the top of the supporting shaft 77d while being guided in the lateral direction. The other long hole 40c of the slider 40 extends higher than the supporting shaft 77e provided upright on the chassis 11. Similarly, the slider 40 is prevented from being come off by an attaching screw 102b screwed in the top of the supporting shaft 77e while being guided in the lateral direction.

An arm member 40d is provided on the side mount base 25 side of the slider 40. At the front end of the arm member 40d, two operation loops 103a and 103b and a positioning piece 104 are provided. As shown in FIG. 17, an operation pin 73e of the swing arm 73 is loosely inserted in one of the operation loops, 103a, of the slider 40 and the operation pin 78d of the stepped switching lever 78 is loosely inserted to the other operation loop 103b. The positioning piece 104 of the slider 40 is used to position the disc tray 17 in the stock position. By fitting the positioning piece 104 to the V-shaped notch 41 of the disc tray 17, the disc tray 17 is positioned in the stock position so that the movement in the back and forth direction is regulated.

As illustrated in FIGS. 3 to 5, an elevating shutter 105 is supported on the front face side of the slider 40 so as to be movable in the vertical direction. The elevating shutter 105 is used to prevent the optical disc D placed on the disc placement part 30 of the disc tray 17 from being moved to the disc loading side by a disturbance such as vibration. Usually, the upper part of the elevating shutter 105 is protruded from the upper end face of the cam member 95. When the disc tray 17 is conveyed to the disc loading side, the elevating shutter 105 is lowered only by a predetermined amount so as to make the disc tray 17 pass.

The elevating shutter 105 has a pair of right and left inclined guide holes 106, 106. In the pair of guide holes 106, 106, a pair of guide pins 107, 107 provided for the slider 40 are slidably fit. As shown in FIG. 3, a spring 108 is provided across the slider 40 and the elevating shutter 105. By the spring force of the spring 108, the elevating shutter 105 is always energized toward the side mount base 25.

In order to regulate the lateral movement of the elevating shutter 105, a stopper 109 is provided upright on the bottom plate 11a of the chassis 11. By the stopper 109, the lateral movement of the elevating shutter 105 is regulated. Further, by guiding the pair of guide pins 107, 107 along the pair of guide holes 106, 106, the whole elevating shutter 105 is pressed down and moves downward almost in parallel.

A Geneva pin gear 110 constructing one of Geneva gears is rotatably supported by the supporting shaft 77e for supporting the side mount base 25 side of the slider 40. As shown in FIGS. 20 and 21, the Geneva pin gear 110 has a cam protruding part 110a protruded in a fan shape, a cam pin 110b provided on the outside in the radial direction of the cam protruding part 110a, and a switch operation part 110c formed by expanding the lower part of the cam protruding part 110a.

Near the Geneva pin gear 110, a Geneva groove gear 111 is slidably provided. A Geneva gear is constructed by the pair of gears 110 and 111. As shown in FIGS. 17 and 20, the Geneva groove gear 111 has a cam groove 111a formed in a cross shape to which the cam pin 110b of the Geneva gear 110 is slidably fit, a stopper curve 111b for checking the transmission of the rotational force, which is slidably in contact with the periphery of the cam protruding part 110a of the Geneva pin gear, and a gear part 111c integrally formed with the cam groove 111a and the stopper curve 111b.

A large diameter part 112a of the drive gear 112 meshes with the gear part 111c of the Geneva groove gear 111. The large diameter part 112a is integrally provided with a small diameter part 112b. The small diameter part 112b is in engagement with the rack 57 of the above-mentioned sliding member 53. As shown in FIG. 17, the Geneva groove gear 111 and the drive gear 112 are rotatably supported by the supporting shafts 77g and 77h provided upright on the chassis 11, respectively.

Further, as shown in FIG. 20, a coil spring 113 is loosely fit in the center part of the Geneva pin gear 110 and one end of the coil spring 113 is seated on a sleeve 114. The sleeve 114 is slidably fit in the central cylindrical shaft of the Geneva pin gear 110. The sleeve 114 is pressed against the under face of the slider 40. By making the cam pin 110b escape from the cam groove 111a against the energizing force of the coil spring 113, it prevents occurrence of a failure such as damage due to application of an excess load between the Geneva pin gear 110 and the Geneva groove gear 111.

As illustrated in FIG. 2, a central mount base 115 is mounted by a plurality of fixing screws 19b between the front mount base 18 and the rear mount base 90. A photoreceiver 48b is attached to the central mount base 115 via a mounting bracket 116. A light emitting device 48a is attached to the sensor holding part 11h provided for the bottom plate 11a of the chassis 11 so as to face the photoreceiver 48b. The photodetector 48 is constructed by the light emitting device 48a and the photoreceiver 48b.

Light (detection light) emitted from the light emitting device 48a and received by the photoreceiver 48b is set so as to pass through the central hole (d) of the optical disc D placed on the disc tray 17 housed in the tray housing part of the tray stocker 12. When the disc tray 17 moves from the stock position to the play position, the detection hole 36 of the disc tray 17 passes across the detection light of the photodetector 48.

As shown in FIGS. 23A to 23F, when the disc tray 17 is moved from the ejection position to the stock position, the detection light of the photodetector 48 enters the open hole 34 of the disc tray 17. At this time, when the optical disc D is placed on the disc placement part 30 of the disc tray 17, the open hole 34 is closed by the information recording face of the optical disc D. As a result, the detection light emitted from the light emitting device 48a is interrupted by the information recording face of the optical disc D and cannot be received by the photoreceiver 48b. Consequently, it can be detected that the optical disc D is placed on the disc placement part 30.

On the other hand, when the optical disc D is not place on the disc placement part 30, the state where the open hole 34 is open is maintained. As a result, the detection light emitted from the light emitting device 48a is detected by the photoreceiver 48b. Consequently, it can be detected that no optical disc D is placed on the disc placement part 30. The presence or absence of the optical disc D is detected when the disc tray 17 moves between the ejection position and the stock position (both at the tray insertion time and the tray ejection time).

Specifically, also when the disc tray 17 is moved between the stock position and the play position, the presence/absence of the optical disc D is detected. When the optical disc D is placed on the disc placement part 30, the detection hole 36 formed in the front part of the disc placement part 30 is closed by the optical disc D. As a result, the detection light from the photodetector 48 is interrupted in the front part of the disc placement part 30 and the photoreceiver 48b cannot receive the detection light. Thus, it can be detected that the optical disc D is placed on the disc placement part 30.

On the other hand, when no optical disc D is placed in the disc placement part 30, the state where the detection hole 36 formed in the front part of the disc placement part 30 is opened is maintained. As a result, when the disc tray 17 is moved to a position where the detection hole 36 is overlapped with the detection light, the detection light emitted from the light emitting device 48a passes through the detection hole 36 and is received by the photoreceiver 48b.

It can be therefore detected that the optical disc D is not placed on the disc placement part 30. The presence or absence of the optical disc D is detected when the disc tray 17 is moved between the stock position and the play position (both at the tray set time and the tray reset time).

A stocker elevating mechanism for moving the tray stocker 12 up and down in the direction almost parallel to the stacking direction of the disc trays 17 is constructed by the above-described vertical groove 26, guide pin 50, sliding member 53, and cam groove 58 for elevation. A switching mechanism is constructed by the slider 40, rear intermediate gear 76, stepped switching lever 78, and elevating gear 80. By the switching mechanism, the driving force of the driving motor 61 as a driving source is selectively supplied to the tray carrying mechanism 60 and the stocker elevating mechanism.

For example, the disc recording and/or reproducing apparatus 10 having such a configuration is used as follows, thereby enabling what is called an exchanging function to be executed. According to the exchanging function, the loading and ejecting work of the optical disc D to/from the five disc trays 17, an operation of selecting and taking a desired one of five optical discs D placed on the disc placement parts 30 of the five disc trays 17 stacked in five layers and recording or reproducing of an information signal such as music play, and a work of exchanging the optical disc D placed on the disc placement part 30 of the other disc tray 17 during the recording or reproduction are performed.

FIGS. 5 to 7 show the state where the disc trays 17 are housed, as an initial state of the disc recording and/or reproducing apparatus 10. In the tray housing state, the swing frame 83 is in a state where its front side is lower. The turntable 33 of the disc rotating device 13 held by the swing frame 83 is in a lowered position. At this time, between the turntable 33 and the disc clamper 89 supported by the rear mount base 90, an appropriate gap so that one disc tray 17 can enter is set.

The tray stocker 12 for holding five disc trays 17 is positioned in the lowermost end in the stock position where the disc tray 17 is housed. As shown in FIG. 23A, the uppermost tray housing part of the tray stocker 12 faces the tray insertion/ejection port 15.

Since the projection 40a fit in the end face cam 95b of the cam member 95 is positioned on the outside of the front face cam 95b, the slider 40 is in a state where it is moved to the side mount base 25 side. As shown in FIG. 17, both of the operation pins 73e and 78d inserted to the two operation loops 103a and 103b of the slider 40 are therefore positioned displaced to the outside. The central feed gear 44 positioning at the other end of the operation pin 73e enters the tray housing part from the open window 45 of the tray stocker 12 and meshes with the rack 39 of the disc tray 17 held in the tray housing part.

In this state, the power source switch is turned on to supply power to an electric system. After that, a tray operation switch in a group of operation switches attached to a front panel (not shown) disposed on the front face or the like of the chassis 11 is operated to make a desired disc tray 17 move forward and protruded forward from the tray insertion/ejection port 15. At this time, in the case of allowing the fifth disc tray 17 which is the highest stage to protrude, the protruding operation can be executed from the initial state. In the case of allowing the fourth or lower disc tray 17 to protrude, the elevating operation of the stocker elevating mechanism which will be described hereinlater is necessary before the protruding operation of the disc tray 17.

First, when the tray operation switch is turned on, the driving motor 61 of the tray carrying mechanism 60 is driven by the function of a controller (not shown). As shown in FIGS. 5, 9 and 10, the rotational force of the driving motor 61 is transmitted from the driving pulley 67 to the three driven pulleys 70a, 72a, and 75a in the front, central, and rear carrying parts via the three rubber belts 68a to 68c. As a result, the feed gears 23 and 44 are rotated via the output gears 70b and 72b and the intermediate gears 71 and 74 in the front and central carrying parts. In the rear carrying part, the feed gear 63 is rotated via the output gear 75b, intermediate gear 76, elevating gear 80, and movable gear 82.

By the rotational force of the central feed gear 44 engaged with the rack 39 of the disc tray 17, the disc tray 17 is moved forward. When the disc tray 17 is moved forward a little, the front end of the rack 39 comes into engagement with the front feed gear 23, so that by the rotational force of the gears 23 and 44, the disc tray 17 is moved further. The tip of the disc tray 17 comes into contact with the door 27 and the door 27 is tilted forward, thereby exposing the tray insertion/ejection port 15.

After that, the central feed gear 44 is apart from the rack 39. By the rotational force of the front feed gear 23, as shown in FIG. 9, the disc tray 17 is moved forward. When the disc tray 17 is protruded to a predetermined position (ejection position), the disc tray 17 in the ejection position is detected by the front and rear detection arms 20 and 21 and the detection switches 22a and 22b attached to the front mount base 18 and the driving motor 61 is stopped on the basis of the detection signal.

In the ejection position, almost the whole disc placement part 30 of the disc tray 17 is ejected from the tray insertion/ejection port 15. Consequently, an optical disc having a diameter of 8 cm can be easily placed in the recess 30b of a small diameter of the disc placement part 30 or an optical disc having a diameter of 12 cm can be smoothly placed in the recess 30a of a large diameter. The disc tray 17 is held so that the parts 17b, 17c to be supported are sandwiched by the pair of tray guides 16, 16 of the chassis 11 and the pair of tray pressers 18a and 18b of the front mount base 18. While making the disc tray 17 project forward as much as possible, the disc tray 17 can be firmly supported by holding the parts 17b, 17c to be supported on one side of the disc tray 17.

Since the sufficiently large ejection amount of the disc tray 17 can be assured, the optical disc D can be easily loaded or ejected to/from the disc placement part 30. Moreover, the guide rails 16a, 16a of the pair of tray guides 16, 16 fit in the guide grooves 38a, 38b provided on both sides of the disc tray 17 and the disc tray 17 is guided along the guide rails 16a, 16a. The disc tray 17 can be therefore moved straight forward and smoothly.

After the desired optical disc D is placed on the disc placement part 30 of the disc tray 17, the front end of the disc tray 17 is lightly pushed or the tray operation switch is operated. By the operation, the driving motor 61 is rotated reversely and the rotational force of the driving motor 61 is transmitted from the front feed gear 23 to the rack 39. The disc tray 17 is pulled into the chassis 11 from the tray insertion/ejection port 15, passes through the position (stock position) where the optical disc D is housed in the tray housing part of the tray stocker 12, and is carried to the position (play position) where the optical disc D is loaded to the turntable 33 of the disc rotating device 13.

At this time, in the case where the optical disc D having a diameter of 12 cm is placed in the large diameter recess 30a of the disc placement part 30 of the disc tray 17 or the optical disc D having a diameter of 8 cm is placed in the small diameter recess 30b, when the disc tray 17 is moved from the ejection position to the stock position, the presence or absence of the optical disc D is detected by the photodetector 48 (FIGS. 23B to 23D).

Specifically, the light emitting device 48a and the photoreceiver 48b of the photodetector 48 are disposed so as to face each other on the path of the central hole (d) of the optical disc D. Consequently, when the disc tray 17 is moved from the ejection position to the stock position, the detection light is interrupted once by the information recording face of the optical disc D. When the detection light reaches the central hole (d) after the information recording face, the detection light is detected again by the photoreceiver 48b.

Irrespective the diameter, 12 cm or 8 cm, of the optical disc D, the presence or absence of the optical disc D can be accurately and certainly determined by the photodetector 48. For example, in the case where the optical disc D of 8 cm is placed off the small diameter recess 30b of the disc placement part 30, when the information recording face of the optical disc D is positioned in a position where the detection light passes, the detection light interrupted state continues in the stock position and the detection light cannot be received by the photoreceiver 48b. By detecting the abnormal state of the photoreceiver 48b, the photodetector 48 can detect the off-state of the optical disc D.

When the disc tray 17 is moved rearward passing the stock position by the rotational force of the central feed gear 44 and the rear part of the rack 39 comes into engagement with the rear feed gear 63, the disc tray 17 is moved by the rotational force of the central and rear feed gears 44 and 63. After that, when the disc tray 17 is moved by a predetermined distance, the central feed gear 44 is apart from the rack 39 and the disc tray 17 is moved by only the rotational force of the rear feed gear 63.

As a result, as shown in FIG. 10, when the optical disc D placed on the disc tray 17 is moved to the position (play position) where the it is loaded to the disc loading unit as a recording and/or reproducing unit, the optical disc D in the play position is detected by the front and rear detection arms 91 and 92 and the detection switches 22c and 22d attached to the rear mount base 90. On the basis of the detection signal, the driving motor 61 is stopped.

Also in the case where the disc tray 17 is moved from the stock position to the play position, the presence/absence of the optical disc D is tested by the photodetector 48 (FIGS. 23D to 23F). To be specific, the detection light emitted from the light emitting device 48a and received by the photoreceiver 48b is first interrupted by the information recording face of the optical disc D when the disc tray 17 is moved toward the play position. Then, the detection light is interrupted by the under face of the disc placement part 30 and is not received by the photoreceiver 48b.

After that, the detection hole 36 opened in the disc placement part 30 reaches the axis of the detection light (FIG. 23E) and the detection light enters the detection hole 36. When the optical disc D is placed in the disc placement part 30, the detection light is continuously interrupted by the information recording face. The presence of the optical disc D can be therefore known according to the interrupting state. On the other hand, when no optical disc D is placed in the disc placement part 30, the detection light passing through the detection hole 36 is detected by the photoreceiver 48b. Consequently, the absence of the optical disc D in the disc placement part 30 can be known.

Such an operation of detecting the optical disc D by the photodetector 48 is similarly performed when the disc tray 17 is moved from the play position to the stock position. When the disc tray 17 is moved both from the stock position to the play position and from the play position to the stock position, the presence or absence of the optical disc D on the disc tray 17 can be detected.

Subsequently, in the play position, the chucking operation of loading the optical disc D onto the turntable 33 and fixing it is performed. The operation of chucking the optical disc D is started by the activation of the cam driving mechanism 97.

As shown in FIGS. 17 and 19, the driving motor 101 of the cam driving mechanism 97 is driven and the rotational force of the driving motor 101 is transmitted from the driving pulley 101a to the cam gear 95a via the rubber belt 68d, driven pulley 100b, driving gear 100a, large diameter part 99b of the intermediate gear, small diameter part 99a of the intermediate gear, and output gear 98. When the cam gear 95a is consequently rotated, the cam pin 94 moves along the lower horizontal part 96c of the cam groove 96 toward the inclined part 96a by the rotation of the cam groove 96.

After the cam pin 94 enters the inclined part 96a, it is gradually pushed up along the inclined part 96a and moved to an upper part. The swing frame 83 is swung upward around the swing shaft 83b as a center in accordance with the lifted amount of the cam pin 94. At this time, by the upward swing of the swing frame 83, the spindle motor 87 supported by the swing frame 83 via the sub-chassis 86 is gradually pushed up and the turntable 33 fixed to the rotary shaft is inserted to the open hole 34 formed in the almost center of the disc tray 17.

At this time, the turntable 33 approaches the optical disc D placed on the disc placement part 30 from the below and the central projection is fit in the central hole (d). In the state where it is fit in the central hole (d), the turntable 33 pushes up the optical disc D. After that, when the cam pin 94 reaches the upper end of the inclined part 96a of the cam groove 96, the optical disc D loaded on the turntable 33 becomes almost horizontal. Then the optical pickup device 14 moves the optical disc D on the disc tray 17 to the position where the optical disc D is lifted from the disc placement part 30.

The disc damper 89 disposed above the turntable 33 is attracted by the turntable 33 by the attracting force of the magnet in the turntable 33. This corresponds to a chucked state shown in FIG. 11. The optical disc D is sandwiched from the upper and lower sides by the turntable 33 and the disc clamper 89 and the operation of chucking the optical disc D is executed.

At this time, when the swing frame 83 is lifted to a certain degree, as shown in FIG. 18, the operation arm 83a comes into contact with the movable gear 82 from below and pushes up the movable gear 82. As a result, the engagement between the movable gear 82 and the large diameter part 80a of the elevating gear 80 is cancelled and the power transmitting path to the feed gear 63 is interrupted. Consequently, although the rear feed gear 63 meshes with the rack 39 of the disc tray 17, the rotation of the rear feed gear 63 is prevented and the still state of the disc tray 17 can be assured.

Simultaneously, the lock pin 117 provided on the top face of the swing frame 83 is inserted to the lock hole 42 formed in the disc tray 17. The disc tray 17 carried to the disc loading part is locked in the loading position by the swing frame 83 moved to the lifting position. As a result, the movement in the carrying direction of the disc tray 17 is prevented. In addition to the means for interrupting the power transmitting path, the movement of the disc tray 17 is prevented more certainly and the secure still state can be assured.

Further, when the cam pin 94 enters the upper horizontal part 96b of the cam groove 96, the driving of the cam driving motor 101 is stopped and the rotation of the cam member 95 is stopped. At this time, the optical head 14c mounted on the carriage 14a of the optical pickup device 14 enters the open hole 34 of the disc tray 17 and the objective lens 14b is positioned close to the information recording face of the optical disc D. Around this time, the spindle motor 87 is driven and the optical disc D chucked on the turntable 33 is rotated at predetermined speed (for example, constant linear velocity).

After that, the optical pickup device 14 is moved in the radial direction of the optical disc D and the optical head 14c writes an information signal onto the information recording face of the optical disc D or reads the information signal which has been already recorded. In such a manner, the recording or reproduction of information by the optical pickup device 14 is executed.

When a desired tray operation switch is operated either to select and eject the disc tray 17 positioning in the fourth or lower shelf of the tray stocker 12, or to select and exchange one of the other four disc trays 17 during reproduction of information, the cam gear 95a is slightly rotated on the lower horizontal part 96c or upper horizontal part 96b. At this time, since the cam pin 94 is held in the upper horizontal part 96b or lower horizontal part 96c, its horizonal state or inclined state is held without causing a change in the posture of the swing frame 83 by the rotation of the cam member 95.

As a result, the projection 40a of the slider 40 fit in the end face cam 95b of the cam member 95 is guided and slides along the cam face. The slider 40 is accordingly moved toward the rotation center of the cam member 95 while being guided by the attaching screws 102a and 102b inserted in the two long holes 40b and 40c. Similarly, the two operation loops 103a and 103b are moved to the cam member 95 side, thereby moving the operation pins 73e and 78d toward the inside.

As a result, the swing arm 73 swings counterclockwise in FIG. 10 by the movement of the operation pin 73e and the central feed gear 44 is moved outward. By the movement of the operation pin 78d, the stepped switching lever 78 swings clockwise in FIG. 17. Since the arm 78c of the stepped switching lever 78 is similarly swung clockwise, the elevating gear 80 slides from the upper face 78f as the first position along the inclined face 78e to the lower face 78g as the second position.

As illustrated in FIGS. 18 and 21, the elevating gear 80 is moved while assuring the engagement between the large diameter part 80a of the elevating gear 80 and the small diameter part 76b of the intermediate gear 76, and the small diameter part 80b comes into engagement with the Geneva pin gear 110. As illustrated in FIG. 17, the rotational force of the driving motor 61 is therefore transmitted from the intermediate gear 76 via the elevating gear 80 to the Geneva pin gear 110. As shown in FIG. 20, the rotational force of the Geneva pin gear 110 is transmitted from the cam pin 110b via the cam groove 111a to the Geneva groove gear 111.

The rotational force of the Geneva groove gear 111 is transmitted from the gear part 111c to the drive gear 112 via the large diameter part 112a. The rotational force of the drive gear 112 is transmitted from its small diameter part 112b to the rack 57 of the sliding member 53. The sliding member 53 accordingly moves toward the optical pickup device 14 which is positioned behind the sliding member 53.

At this time, the guide pins 50, 50 fixed to the tray stocker 12 are slidably fit in the stairlike cam grooves 58, 58 for elevation formed in the sliding member 53 and, as shown in FIGS. 4 and 7, the guide pins 50, 50 are movable only in the vertical direction along the vertical grooves 26, 26 formed in the chassis 11. Consequently, when the sliding member 53 is moved toward the optical pickup device 14, the guide pins 50, 50 are pushed upward by being guided by the cam grooves 58, 58 for elevation.

The tray stocker 12 supported by the four guide pins 50, 50 is pushed upward in the direction almost parallel to the stack direction of the tray stocker 12 while being held in the almost horizontal state. At this time, the five horizontal parts 58a which are parallel to each other of the cam grooves 58, 58 for elevation are formed in correspondence with the five tray housing parts of the tray stocker 12. For example, when the guide pins 50, 50 move from the lowermost horizontal part 58a to the third horizontal part 58a, the tray stocker 12 is lifted by an amount of two stages and the tray housing part positioning at the third stage from the top is moved to the height same as that of the tray insertion/ejection port 15.

In such a state, by making the disc tray 17 at the third stage protrude from the tray insertion/ejection port 15, even during reproduction of information, the desired disc tray 17 is ejected and the optical disc D can be exchanged or newly loaded. The ejection state during reproduction is shown in FIG. 12. In FIG. 12, the disc tray 17 housed in the lowermost tray housing part of the tray stocker 12 is ejected from the tray insertion/ejection port 15.

By either pushing the ejected disc tray 17 or operating the corresponding tray operation switch, the ejected disc tray 17 is housed into the tray stocker 12. It makes the elevating operation of the tray stocker 12 possible. For example, the tray stocker 12 is moved to eject the second or fourth disc tray 17 and a new optical disc D is inserted or an exchanging work of the optical disc D can be performed. An operation of lowering the tray stoker 12 to the lowermost stage and returning the disc tray 17 on which the optical disc D to which a reproducing operation until then has been stopped and which has been returned is placed to the fifth tray housing part can be performed.

After that, when the operation of reproducing music play or the like is finished, the driving of the spindle motor 87 is stopped. Simultaneously, the cam driving motor 101 of the cam driving mechanism 97 is driven to rotate the cam member 95. It makes the cam pin 94 come off from the upper horizontal part 96b of the cam groove 96 and move along the inclined part 96a to the lower horizontal part 96c. As a result, the posture of the swing frame 83 is changed from the lifted position where the swing frame 83 is in an almost horizontal state shown in FIG. 11 to the lowered position where the swing frame 83 is in the inclined state shown in FIG. 6.

At this time, by the downward swing of the swing frame 83, the turntable 33 is gradually lowered and is detached from the disc clamper 89 against the attracting force of the magnet. The chucking of the optical disc D by the turntable 33 and the like is accordingly cancelled and the optical disc D is left on the disc placement part 30 of the disc tray 17 carried to the loading position.

The disc tray 17 can be therefore carried from the play position to the stock position of the fifth tray housing part in the tray holder 12. When the disc tray 17 is moved forward and carried to the tray housing part of the tray stocker 12, the driving of the driving motor 61 is stopped. As a result, the disc recording/reproducing apparatus 10 is returned to the original stock position shown in FIGS. 5 and 6.

Although the description has been given above, the invention is not limited to the foregoing embodiment. For example, although the case where the invention is applied to the disc recording/reproducing apparatus capable of performing both recording and reproduction by using an optical disc as a disc-shaped recording medium has been described, obviously, the invention can be applied to an apparatus dedicated to recording or reproduction. Further, a magneto optic disc, a magnetic disc, and the like can be used as the disc-shaped recording media. Further, although the case where the five disc trays are stacked has been described in the embodiment, the number of disc trays may be four or less or six or more.

The case where the optical disc is chucked by changing the posture of the turntable by swinging the swing frame around the swing shaft as a center has been described in the above-mentioned embodiment. Besides, for example, the disc-shaped recording medium can be also chucked by the advancing/retreating movement of the turntable side by moving the swing frame in the direction which perpendicularly crosses the moving direction of the disc tray. As mentioned above, the invention can be variously modified without departing from its spirit and scope.

What is claimed is:

1. An apparatus for recording and/or reproducing a disc-shaped recording medium, comprising:

a plurality of placement members on each of which a disc-shaped recording medium is placed;

a housing unit in which the placement members are stacked and housed;

an elevating mechanism for elevating the housing unit in the direction almost parallel to the stack direction of the placement members;

a recording and/or reproducing unit for recording or reproducing the disc-shaped recording medium;

a carrying mechanism for carrying one of the plurality of placement members among a position where a disc-shaped recording medium can be placed or ejected to/from the placement member, a position where the placement member is housed in the housing unit and a position where the disc-shape recording medium placed on the placement member is loaded to the recording and/or reproducing unit;

a driving source for driving both the carrying mechanism and the elevating mechanism;

a switching mechanism for selectively supplying a driving force from the driving source to the carrying mechanism and the elevating mechanism; and a photodetector for detecting the presence/absence of the disc-shaped recording medium on the plurality of placement members housed in the housing unit.

2. An apparatus for recording and/or reproducing a disc-shaped recording medium according to claim 1, wherein the photodetector detects the presence/absence of the disc-shaped recording medium on the placement member during movement of the placement member from the position where the disc-shaped recording medium can be placed or ejected to the position where the placement member is housed.

3. An apparatus for recording and/or reproducing a disc-shaped recording medium according to claim 1, wherein the photodetector detects the presence/absence of the disc-shaped recording medium on the placement member during movement of the placement member from the housing position to the loading position.

* * * * *